US011825975B2

(12) United States Patent
McClean et al.

(10) Patent No.: US 11,825,975 B2
(45) Date of Patent: Nov. 28, 2023

(54) SLOW COOKER

(71) Applicant: BREVILLE PTY LIMITED, Alexandria (AU)

(72) Inventors: Stephen John McClean, Camden South (AU); Pierce James Barnard, Cherrybrook (AU); Duncan Bruce Hellmers, Lane Cove (AU)

(73) Assignee: BREVILLE PTY LIMITED, Alexandria (AU)

( * ) Notice: Subject to any disclaimer, the term of this patent is extended or adjusted under 35 U.S.C. 154(b) by 705 days.

(21) Appl. No.: 16/308,760

(22) PCT Filed: Jun. 7, 2017

(86) PCT No.: PCT/AU2017/050565
§ 371 (c)(1),
(2) Date: Dec. 10, 2018

(87) PCT Pub. No.: WO2017/210736
PCT Pub. Date: Dec. 14, 2017

(65) Prior Publication Data
US 2019/0142204 A1 May 16, 2019

(30) Foreign Application Priority Data

Jun. 8, 2016 (AU) ................. 2016902233

(51) Int. Cl.
*A47J 27/00* (2006.01)
*A47J 36/02* (2006.01)
(Continued)

(52) U.S. Cl.
CPC .......... *A47J 27/002* (2013.01); *A47J 27/004* (2013.01); *F24H 3/04* (2013.01); *F24H 9/2071* (2013.01)

(58) Field of Classification Search
CPC .......... A47J 27/002; A47J 27/004; F24H 3/04
See application file for complete search history.

(56) References Cited

U.S. PATENT DOCUMENTS

| 1,145,977 A | 7/1915 | Denhard |
| 2,753,436 A * | 7/1956 | Schwaneke ......... A47J 37/1209 99/403 |

(Continued)

FOREIGN PATENT DOCUMENTS

| CN | 101138468 A | 3/2008 |
| CN | 202636599 U | 1/2013 |

(Continued)

OTHER PUBLICATIONS

International Search Report issued in PCT Application No. PCT/AU2017/050565, dated Aug. 22, 2017.
(Continued)

*Primary Examiner* — Helena Kosanovic
*Assistant Examiner* — Lawrence H Samuels

(57) ABSTRACT

A slow cooking appliance device. The device including: a body having a base, the body receives within it a removable cooking vessel; a movable heating element supported by the base; and a lift mechanism within the base for raising and lowering the movable heating element, such that the heating element is movable between an upper position and a lowered position.

14 Claims, 25 Drawing Sheets

(51) Int. Cl.
*F24H 3/04* (2022.01)
*F24H 9/20* (2022.01)

(56) References Cited

U.S. PATENT DOCUMENTS

| | | | | |
|---|---|---|---|---|
| 3,657,996 | A * | 4/1972 | Thompson | A47J 37/0704 99/443 R |
| 4,258,695 | A | 3/1981 | McCarton et al. | |
| 4,670,282 | A * | 6/1987 | Onishi | G05D 23/26 219/441 |
| 4,926,843 | A * | 5/1990 | Vocke | A47J 27/022 126/390.1 |
| 5,004,121 | A * | 4/1991 | Howe | A47J 36/04 219/725 |
| 5,411,014 | A * | 5/1995 | Paul | A47J 27/022 220/608 |
| 5,909,820 | A * | 6/1999 | Yeh | A47J 41/0016 220/711 |
| 7,973,264 | B2 * | 7/2011 | Li | F24C 7/06 219/404 |
| 8,820,310 | B1 * | 9/2014 | Plott | A47J 37/0713 126/30 |
| 10,368,679 | B2 * | 8/2019 | Chou | A47J 27/004 |
| 2006/0260473 | A1 * | 11/2006 | Nybakke | A47J 36/34 99/422 |
| 2008/0099461 | A1 * | 5/2008 | Li | A47J 37/0641 219/402 |
| 2008/0135540 | A1 * | 6/2008 | Wu | H05B 3/68 219/451.1 |
| 2008/0257166 | A1 * | 10/2008 | Peng | A47J 27/004 99/337 |
| 2008/0264926 | A1 * | 10/2008 | Peng | H05B 3/68 126/218 |
| 2008/0264927 | A1 * | 10/2008 | Peng | F24C 15/104 219/448.11 |
| 2014/0326733 | A1 * | 11/2014 | Park | A47J 27/002 220/573.1 |
| 2015/0354827 | A1 * | 12/2015 | Faraldi | A21B 3/04 426/510 |
| 2016/0367061 | A1 * | 12/2016 | Chou | A47J 36/2483 |
| 2019/0142204 | A1 * | 5/2019 | McClean | A47J 27/002 219/621 |

FOREIGN PATENT DOCUMENTS

| | | |
|---|---|---|
| CN | 203987467 U | 12/2014 |
| CN | 104970695 A | 10/2015 |
| CN | 105534269 A | 5/2016 |
| EP | 2700338 A1 | 2/2014 |
| WO | WO-2015196328 A1 | 12/2015 |

OTHER PUBLICATIONS

International Preliminary Report on Patentability issued in PCT Application No. PCT/AU2017/050565, dated Oct. 19, 2017.
Extended European Search Report for European Patent Application No. 17809455.3, dated Sep. 18, 2019.
Communication pusuant to Article 94(3) EPC issued in European Patent Application No. 17 809 455.3, dated Apr. 8, 2022.

* cited by examiner

SLOW COOKER

FIELD OF THE INVENTION

The invention relates to slow cookers and more particularly to an electric slow cooker that is also able to sear foods.

BACKGROUND OF THE INVENTION

Electrical slow cookers are well known. Slow cookers with searing functionality are also known. However, conventional searing slow cookers utilise two distinct heating elements. A lower heating element is used primarily for high temperature searing and a second heating element surrounds the cooking vessel and is used during slow cooking. The present invention seeks to simplify and improve the performance of searing slow cookers by providing only a single heating element together with (optionally) an improved user interface. In addition, the invention seeks to provide cooking methods or modes that best utilise the novel mechanical and electro-mechanical features that the invention provides.

SUMMARY OF THE TECHNOLOGY

The present technology provides a slow cooker with searing functionality.

According to an aspect of the technology, there is provided a slow cooking appliance device, the device including: a body having a base, the body receives within it a removable cooking vessel; a movable heating element supported by the base; and a lift mechanism within the base for raising and lowering the movable heating element, such that the heating element is movable between an upper position and a lowered position.

Preferably, when the movable heating element is in the upper position, the movable heating element is substantially conductively thermally coupled to the removable cooking vessel. More preferably, when the movable heating element is in the lowered position, the movable heating element defines a gap such that the removable cooking vessel is substantially heated by the movable heating element through a process of convection heating.

Preferably, the lift mechanism uses a jack screw assembly to raise and lower the movable heating element.

Preferably, the lift mechanism is operated by a motor that is controlled by a processor for raising and lowering the movable heating element.

Alternatively, the lift mechanism may also be manually operated by a movable lever that acts to raise and lower the movable heating element. Preferably, an upper surface of the movable heating element substantially conforms to an underside of the vessel for enabling conductive heating there between.

Preferably, the removable cooking vessel has a floor and a side wall, and an underside of the vessel floor defines a circumferential groove.

The device preferably includes a liner located within the body for receiving the removable cooking vessel.

Preferably, the liner is carried by the movable heating element. More preferably, the liner travels up and down with the movable heating element and makes sliding contact with a collar that is supported by the body.

Preferably, the liner extends from an upper rim of the body to a location below the movable heating element; the liner has an internal rim that defines a central opening through which extends the lift mechanism. More preferably, the liner defines a lower internal circumferential trough for capturing debris that falls between the vessel and the liner. The liner may also preferably carry a drain tube that is located about a low point of the trough for carrying fluids from the trough.

Preferably, the liner is supported by the body and substantially confirms to the removable vessel, and the movable heating element and the lift mechanism are located beneath the liner such that the heating element contacts an underside of the liner when in the upper position.

The device preferably includes a temperature sensor that is in thermal communication with the vessel. Preferably, a sensor plate carries the temperature sensor, and the sensor plate is adapted to make thermal contact with the lower surface of the vessel floor. More preferably, the temperature sensor transmits a temperature signal to a processor for regulating a cooking processes. The temperature sensor may be located above an electric fan.

Preferably, the liner has vents, and the device further includes an electric fan that causes air flow through the vents and about the heating element.

The device preferably includes an electric fan that assist convection heat transfer from the heating element.

According to an aspect of the technology, there is provided a slow cooking appliance device, the device including: a removable cooking vessel; a body having a base; a liner located within the body for receiving the removable cooking vessel; a vertically movable heating element supported by the base; and a lift mechanism within the base for raising and lowering the movable heating element, such that the heating element has an upper position in which it is substantially conductively thermally coupled to an underside of the vessel and a lowered position in which a gap is formed between the movable heating element and the underside of the vessel.

Preferably, the device further includes an electric fan that assists convection heat transfer from the heating element by circulating air about the heating element.

Preferably, the device further includes a temperature sensor that is in thermal contact with the vessel.

The liner preferably defines a lower internal circumferential trough for capturing debris that falls between the vessel and the liner.

According to an aspect of the technology, there is provided a slow cooking appliance device including: a body that receives within it a removable cooking vessel; the base supporting a vertically movable heating element; the movable heating element having an upper position in which it is in conductive thermal contact with an underside of the vessel and a lowered position in which a gap is formed between the movable heating element and the underside; and a mechanism within the base for raising and lowering the movable heating element.

Accordingly, there is provided an electrical slow cooker with searing functionality having a removable cooking vessel under which is located a heating plate that is removable between two cooking position limits.

In some embodiments of the invention, the heating plate is moved by a motor in response to a user input from the user interface.

In other embodiments of the technology, the heating plate is manually adjusted between the two distinct position limits.

There is also provided a searing slow cooker having a single heating element located below a removable cooking vessel.

In preferred embodiments of the technology, the side walls of the cooking vessel and the interior side walls of the base that supports the cooking vessel define a generally cylindrical flow path or chamber for hot air.

In other embodiments of the invention, the interior side wall of the device moves in unison with the heating element.

BRIEF DESCRIPTION OF THE DRAWING FIGURES

In order that the invention be better understood, reference is now made to the following drawing figures in which.

BEST MODES AND OTHER EMBODIMENTS OF THE TECHNOLOGY

Figure 1:
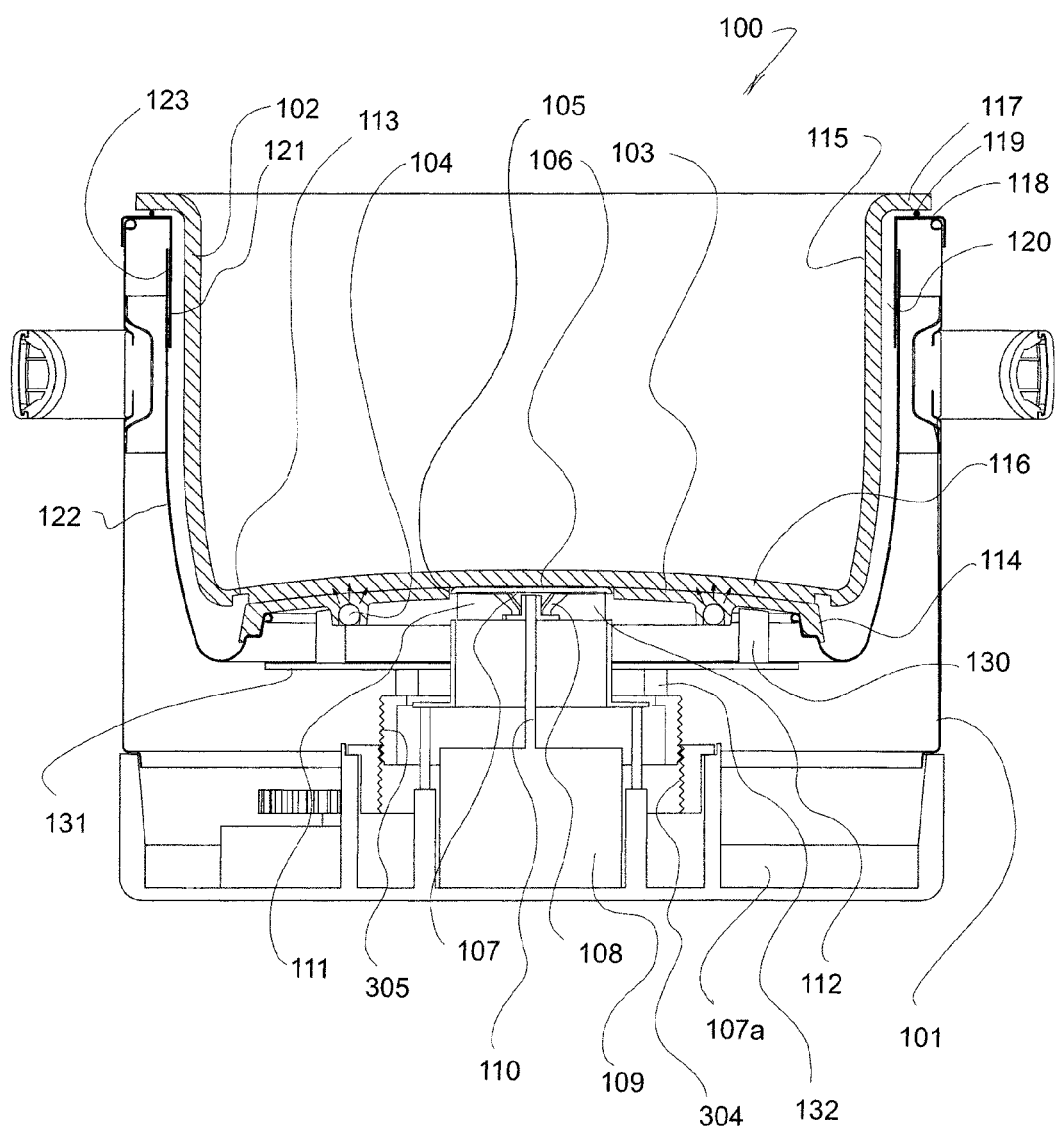
FIG. 1 is a cross sectional view of a slow cooker with searing functionality.

As shown in FIG. 1, an electrical slow cooker with searing functionality 100 comprises a body or base 101 that receives and supports within it a removable cooking vessel 102. The base supports a vertically movable heating plate 103. The heating plate 103 has, for example, at least a single electrical heating element 104. The heating plate and its heating element 103, 104 move from an uppermost or searing position as shown in FIG. 1 to a fully lowered or slow cooking position as will be explained. The heating plate and its heating element may also assume any position between the upper and lower limits of movement. The heating plate is supported by posts 130 that connect it to a metal heat shield 131. In this example the shield 131 is attached to an actuator (as will be explained) by second post 112.

In the embodiment of FIG. 1, the heating plate 103 has a central opening 105 through which protrudes a sensor plate 106. The top of the sensor plate io6 is generally flush with the top of the heating plate 103 when the heating plate is at its upper most or searing orientation. In some embodiments, the sensor plate and heating plate are adapted to make contact with the lower surface of the vessel floor simultaneously. The sensor plate 106 carries a heat sensor such an NTC thermistor that transmits temperature data to the device's electronic controller 107. Temperature data is used by the controller to regulate cooking processes or to provide an indication that the vessel has been removed, as is known in the art. The sensor plate io6 supports or contacts the underside 116 of the cooking vessel 102 and is stationary in this example. Below the sensor plate io6 is located a rotating electrical fan 108 that is driven by the device's fan motor 109. An elongated shaft no connects the motor 109 to the fan 108. The controller drives the fan 108 to discharge a flow of air through a gap 111 or one or more openings 112 located below the sensor plate 106 during slow cooking.

As further depicted in FIG. 1, the cooking vessel 102 may have a peripheral groove or area of reduced thickness 113 formed around the periphery of the floor, preferably on the underside of the floor. The peripheral groove 113 is located adjacent to or radiantly outward of the outer edge 114 of the heating plate. The area of reduced thickness or groove 113 limits the flow of heat to the sidewall 115 of the vessel during searing, that is, when the heating plate 103 is in contact with the underside of the vessel. In this example, the underside of the vessel's floor 116 is slightly concave and conforms to the slightly convex shape of the heating plate 103.

In preferred embodiments, the vessel 102 has an outwardly extending flange or rim 117 that is supported above the upper most surface 118 of the base by a polymeric seal 119. The seal 119 prevents hot air from escaping through the gap between the rim 117 and the upper surface 118.

In some embodiments, the sheet metal forming the upper surface 118 also forms an upper extent of the cavity 120 that receives the vessel. Thus a fixed interior collar 121 is formed. In the example of FIG. 1, the heating plate 103 carries an optional liner 122 that travels vertically up and down with the heating plate 103. The upper portion 123 of the liner 122 makes sliding or surface contact with the collar 121 that it surrounds. In this way hot air within the chamber 120 is inhibited from entering the interior of the body.

Figure 2:
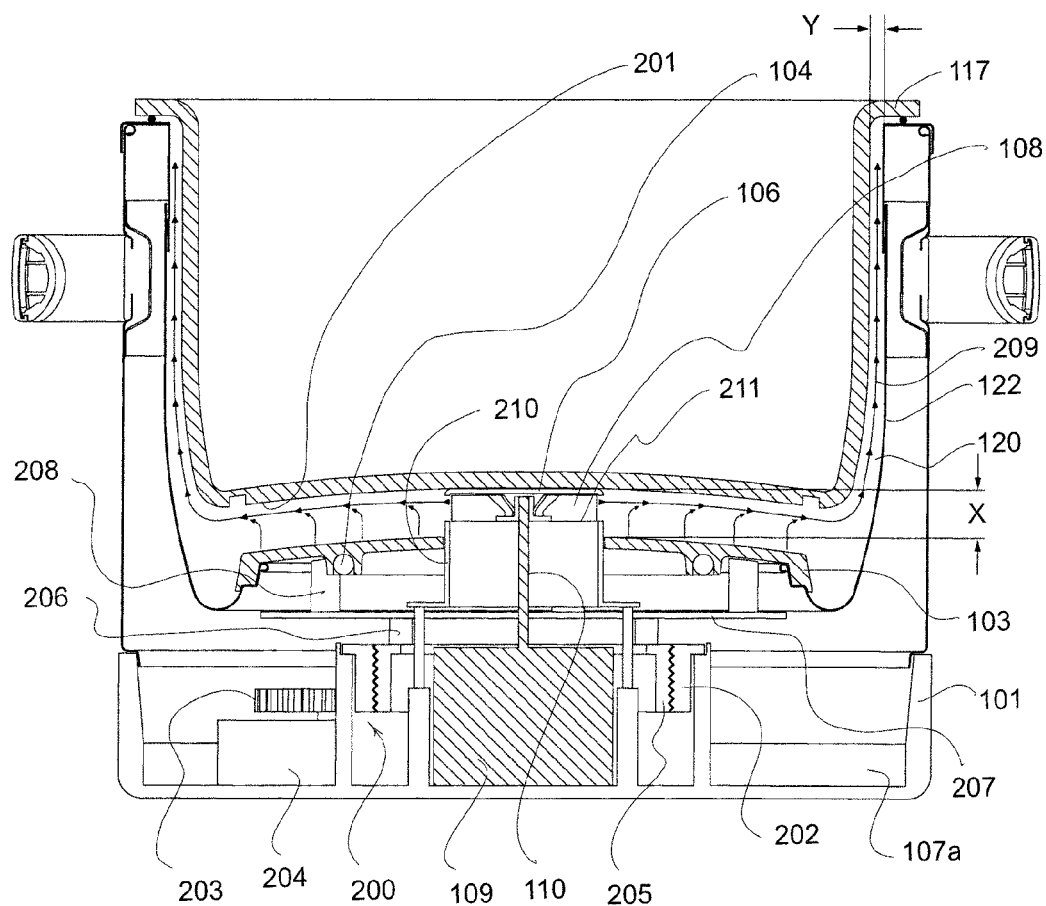
FIG. 2 is a cross section of the device depicted in FIG. 1, where the heating plate and the heating elements have been lowered into a slow cooking orientation.

As suggested by FIG. 2, an actuator such as a jack screw mechanism 200 is capable of translating the heating plate 103 and the liner 122 so as to separate the heating plate 103 from the underside 201 of the cooking vessel. In this example, the jack screw or actuator 200 comprises a rotating outer rim 202 having external teeth that are driven by a pinion gear 203. The pinion gear 203 is driven by an electric motor 204 that is controlled by the device's microprocessor or controller 107a. Rotation of the outer ring 202 causes a co-operating and threaded inner ring 205 to rise and lower relative to the base 101. The inner ring 205 carries (via second posts 206 or otherwise) a metal ring 207. The first posts 208 interconnect the metal ring 207 to the underside of the heating plate. The metal ring 207 acts as a heat sink and shield, protecting components below the ring from heat generated by the heating element 104. Thus, rotation of the pinion gear 203 causes the heating plate 103 and the liner 122 to go up and down (reciprocate vertically). When the heating plate 103 is spaced away from the underside of the vessel, a gap X is formed between the vessel and the heating plate. The gap and chamber 120 communicate. In this way, the volume of the chamber 120 increases as the heating plate and liner are lowered. Heated air (exclusively) heats the vessel during slow cooking operations. When in the searing orientation, the heating plate heats primarily the floor of the vessel, whereas in the slow cooking orientation, hot air generated by the heating plate heats both the underside of the vessel and the side wall of the vessel. The generally cylindrical gap Y must be adequate for hot air to rise to a point adjacent to or just under the rim 117 of the vessel. Accordingly, the gap Y is from about 1 to 20 MM. The gap X is preferably less than 50 mm.

As further shown in FIG. 2, the shaft 110 that connects the fan motor 109 to the centrifugal (or other) fan 108 passes through a cylindrical riser or sleeve 210 that directly or indirectly supports the sensor plate 106.

The upper edge 211 of the sleeve is above the upper surface of the heating plate 103 when the heating plate is in the lowermost or slow cooking orientation.

Figure 3:
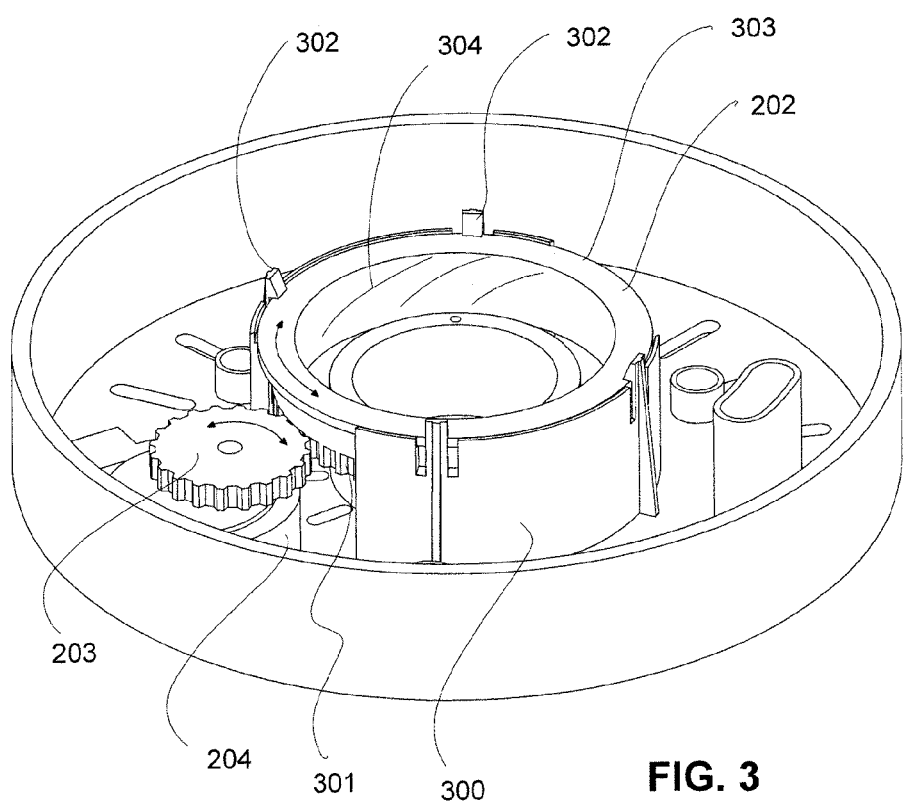
FIG. 3 is a perspective view of the outer ring and synchronous motor depicted in FIG. 1 and FIG. 2.

As shown in FIG. 3, the outer ring 202 of the actuator 200 is supported and restrained by curved retaining walls 300. A gap in the retaining wall 300 allows the rotating pinion gear 203 to make contact with teeth 301 formed on an outer surface of the outer ring 202. The retaining walls 300 carry flexible teeth or clips 302 that allow the outer ring 202 to be easily installed and yet prevent the outer ring from translating vertically. The clips 302 engage an upper rim 303 of the outer ring. The inner surface of the outer ring carries threads 304 that co-operate with threads 305 formed on an outside surface of the inner ring 205 as shown in FIG. 4.

Figure 4:
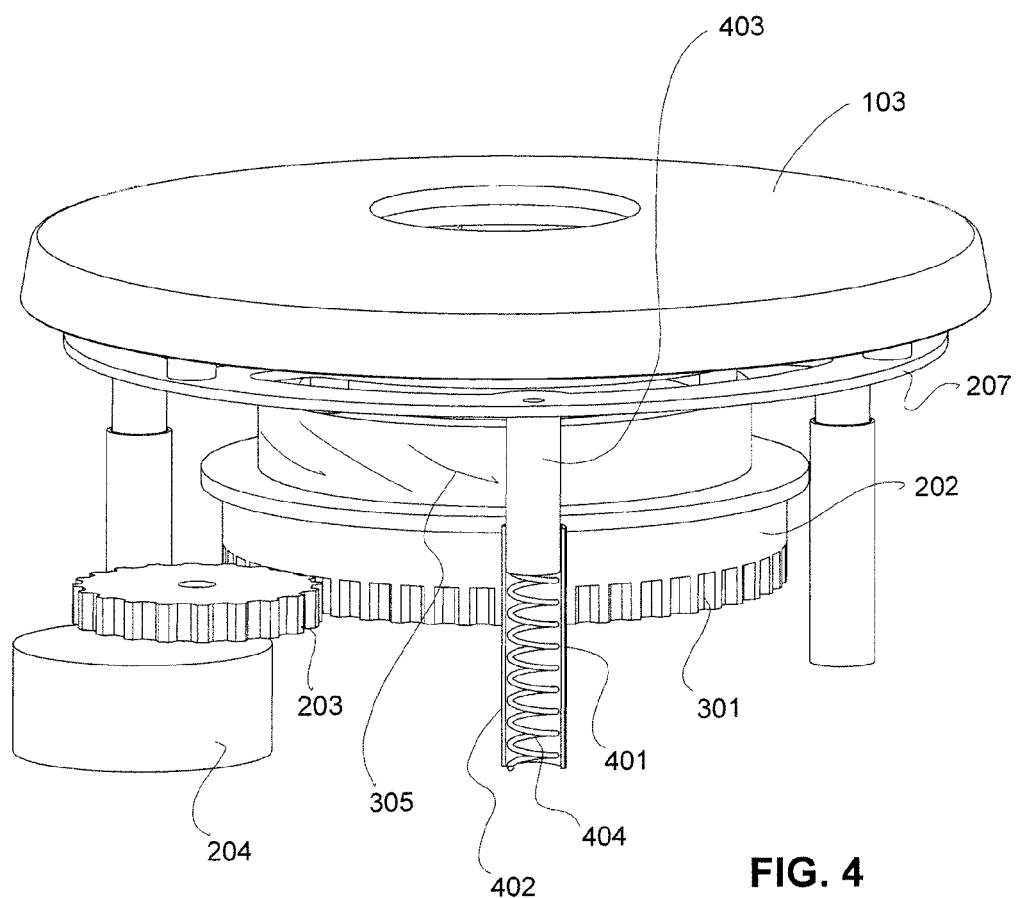
FIG. 4 is a perspective view illustrating the stabilising rods and protective ring.

As shown in FIG. 4, the vertical reciprocation of the heating plate 103 and the metal ring 207 is stabilised by an array of telescopic supports 401. Each support 401 comprises a lower and outer tube 402 that is carried by the base. Rods 403 extend from the metal ring 207 to a location within the tubes 401. The rods 403 may be polymeric to suppress heat transfer from the ring 207. A compression spring 404 supports the rods 403 and minimises misalignment between the rods 403 and the tubes 401. In preferred embodiments, there are a minimum of two and in this example three rods 403 spaced at 120 degrees.

It would be appreciated that the fan 108 is preferably programmable to operate in slow cooking modes, that is, when the heating plate 103 is lowered and forms a gap X with respect to the underside of the vessel. The controller 107a causes the fan to operate to circulate air within the gap X and chamber 120 during slow cooking modes and preferably ceases operation of the fan during high temperature and searing modes when air cannot flow over the heating plate 103 into the chamber 120.

Figure 5:
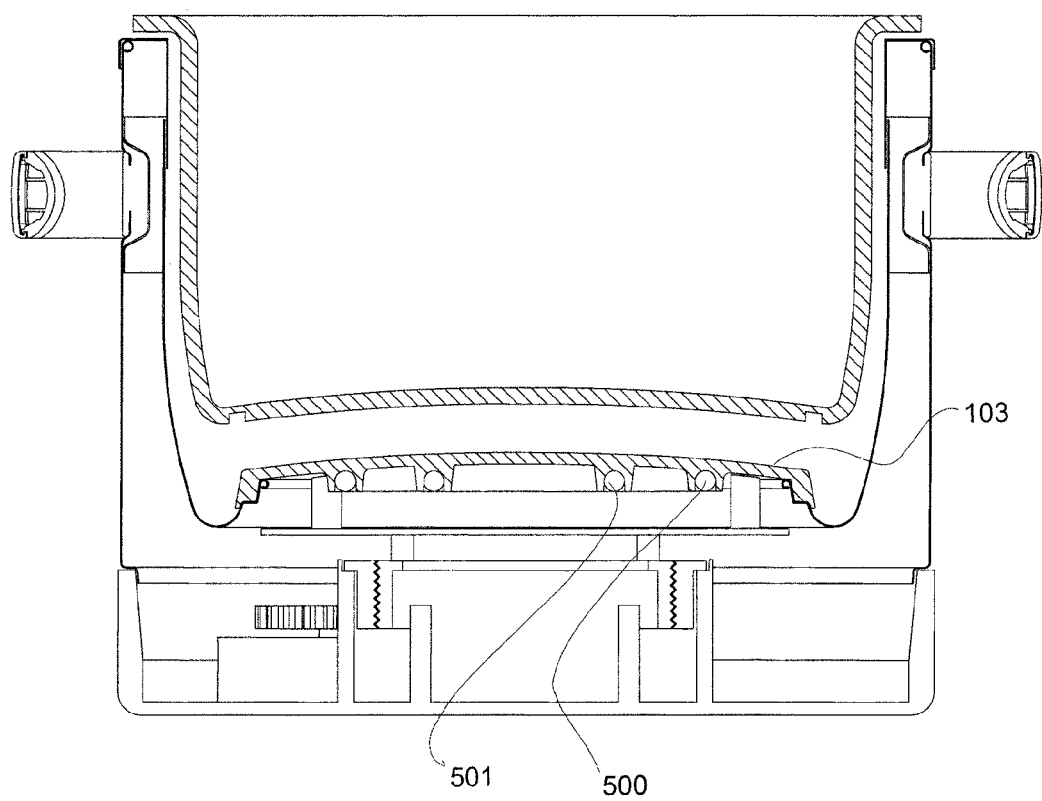
FIG. 5 is a cross sectional view illustrating a heating plate with dual heating elements.

As suggested by FIG. 5 the heating plate 103 may carry one, two or more heating elements 500, 501. Two separate heating elements allow the device to utilise higher wattages for searing. Supplying power to only one of the heating elements 500, 501 allows lower wattages for slow cooking whereas both can be activated for high temperature searing.

Figure 6:
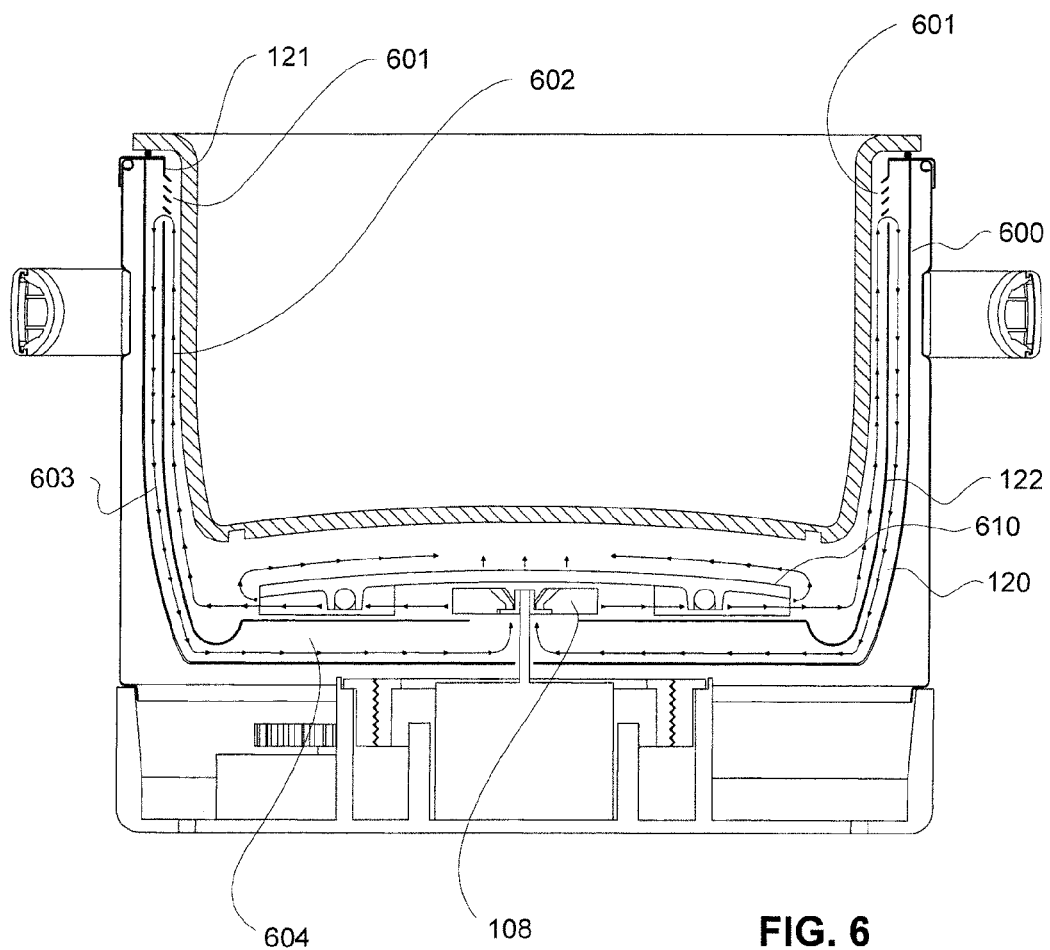
FIG. 6 is a cross section of an alternate embodiment where heated air is recirculated by the device's fan.
Figure 7:
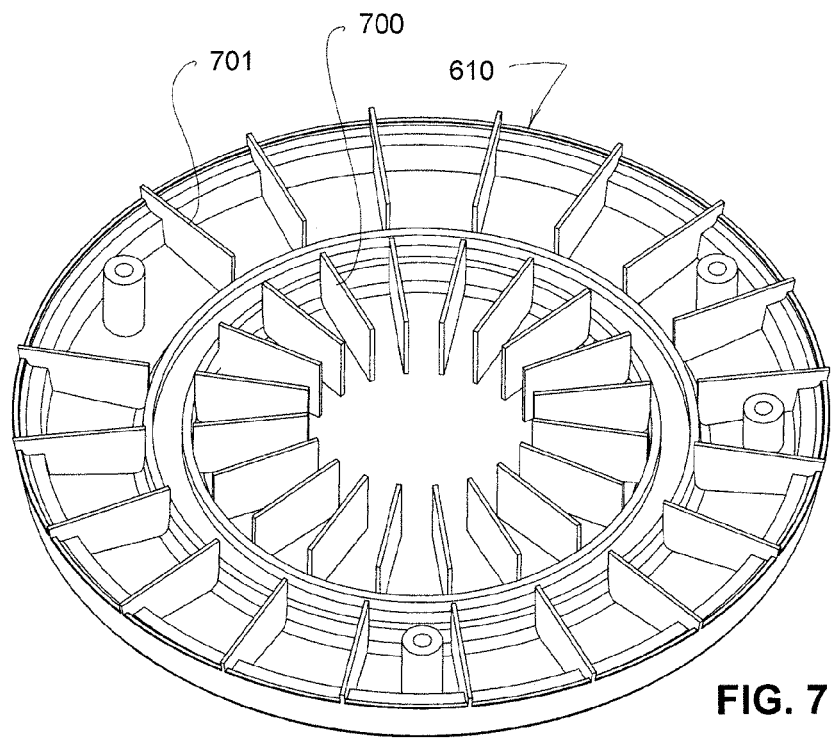
FIG. 7 is an underside perspective view of the heating plate depicted in FIG. 6.
Figure 8:
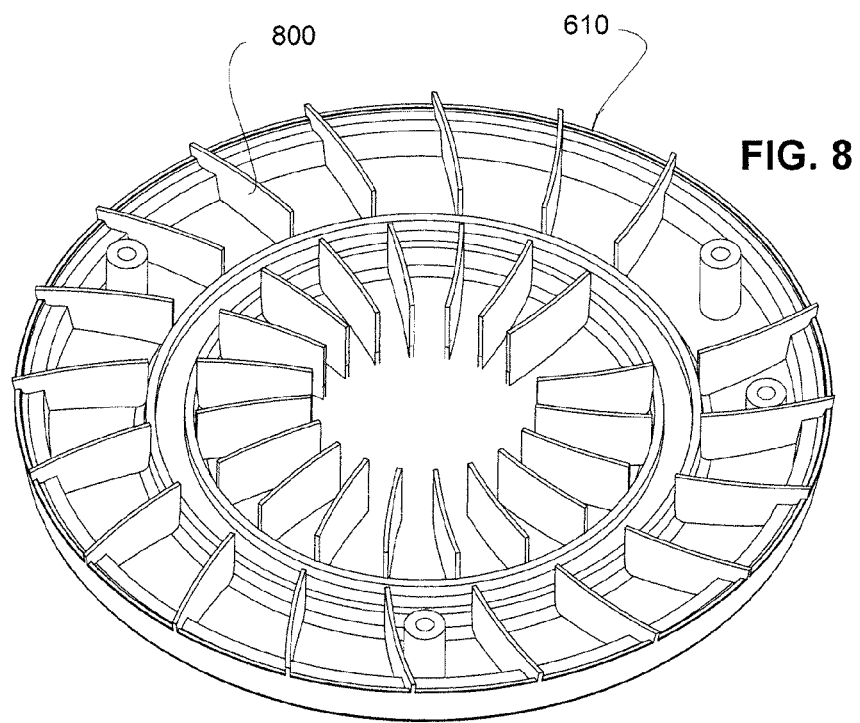
FIG. 8 is an underside perspective view of the heating plate depicted in FIG. 6.

As shown in FIG. 6, the moving liner 122 may have radially outward from it, a second liner 600 (Further clarification). The second liner 600 is fixed and isolates the air chamber 120 from the interior of the base. In this embodiment, the collar 121 has vents 601 that are exposed as the liner 122 descends. Hot air, particularly when propelled by the fan 108, rises in the chamber 602, passes through the vents 6oi and descends between the liner 122 and the second liner 600. Previously heated air descends 603 and is collected in a plenum 604 located below the fan 108. The fan 108 draws and recycles previously heated air during slow cooking functions. As shown in FIG. 7 and FIG. 8, the underside of the heating plate 610 may be provided with one or more rays of radially extending fins 700, 701 which help to disperse hot air from the heater plate into the chamber 120. In the example of FIG. 7, two concentric arrays are provided 700, 701. There are more radial fins in the inner array 700 than in the outer array 701. Note that in this example, the heating plate 610 lacks a central opening. As shown in FIG. 8, the ribs in one or both arrays may be curved 800.

Figure 9:
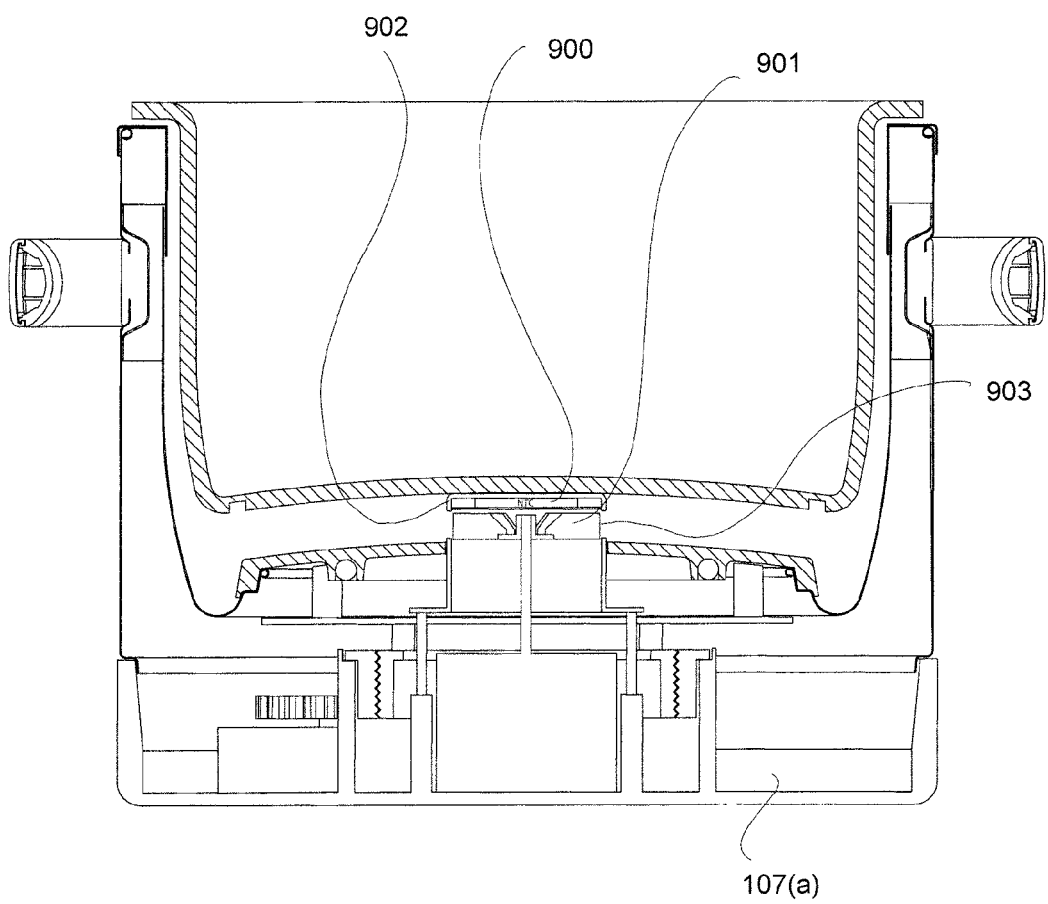
FIG. 9 is cross sectional view of a slow cooker with searing functionality illustrating the location of the thermal sensor and its metallic cap.

In preferred embodiments of the invention, a thermal sensor is required to detect the temperature of the cooking vessel and transmit a representative signal to the device's controller 107a. Although a temperature sensor for such a purpose may be located in various positions and may be of various types. In the example of FIG. 9 an NTC temperature sensor 900 is located above the fan 901. It may be retained by or protected by a thermally conductive plate such as a sheet metal plate 902 that is friction fit to the fan's housing 903.

Figure 10:
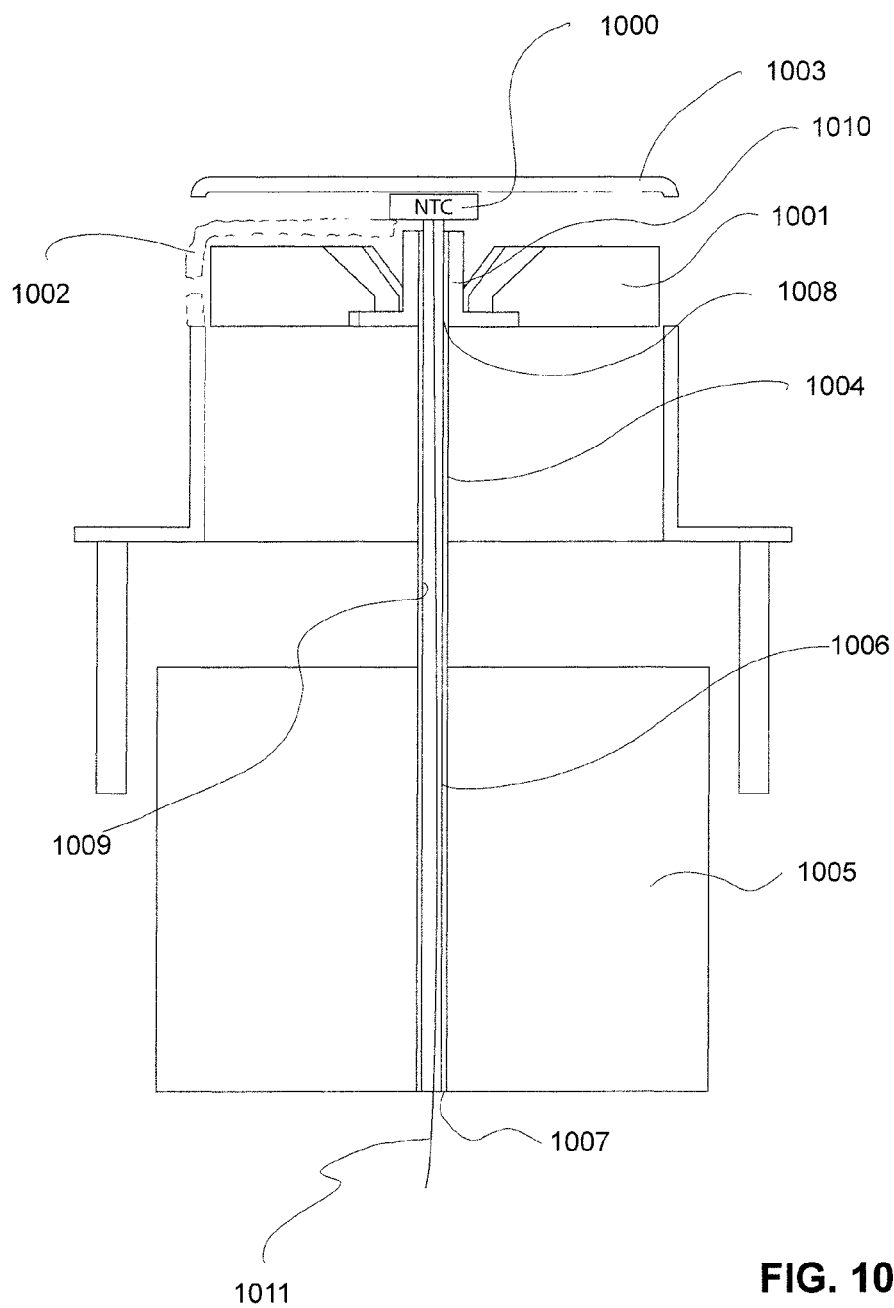
FIG. 10 is a cross-sectional schematic view of a motor and fan assembly wherein hollow shafting allows the temperature sensor's electrical lead to pass through the fan shaft and motor.

Another example of a temperature sensor mounting is depicted in FIG. 10. In this example, an NTC thermistor 1000 is mounted above the fan 1001. The NTC thermistor woo may be mounted above or recessed into the fan housing 1002. As with the example of FIG. 9, the NTC thermistor may be covered by a metallic plate 1003 that protects the NTC and acts as a thermal distributor. It is adapted to make contact with the underside of the cooking vessel. In this example, the rotating shaft 1004 between the motor 1005 and the fan 1001 is hollow or tubular. The motor's central shaft 1006 is also hollow or tubular and may be a continuation of the fan shaft 1004. Thus a continuous passage way is formed from the lower end of the motor 1007 through to the fan's hollow central hub 1008. This allows a second tube 1009 to be located within the shafting 1004, 1006. In this way the NTC thermistor's electrical lead can pass through the fan's hollow hub 1010, through the shafting 1004, 1006 and thus through the motor. The lead 1011 is protected by the inner tube 1009 and neither wears, nor rotates when the motor drives the fan.

Figure 11:
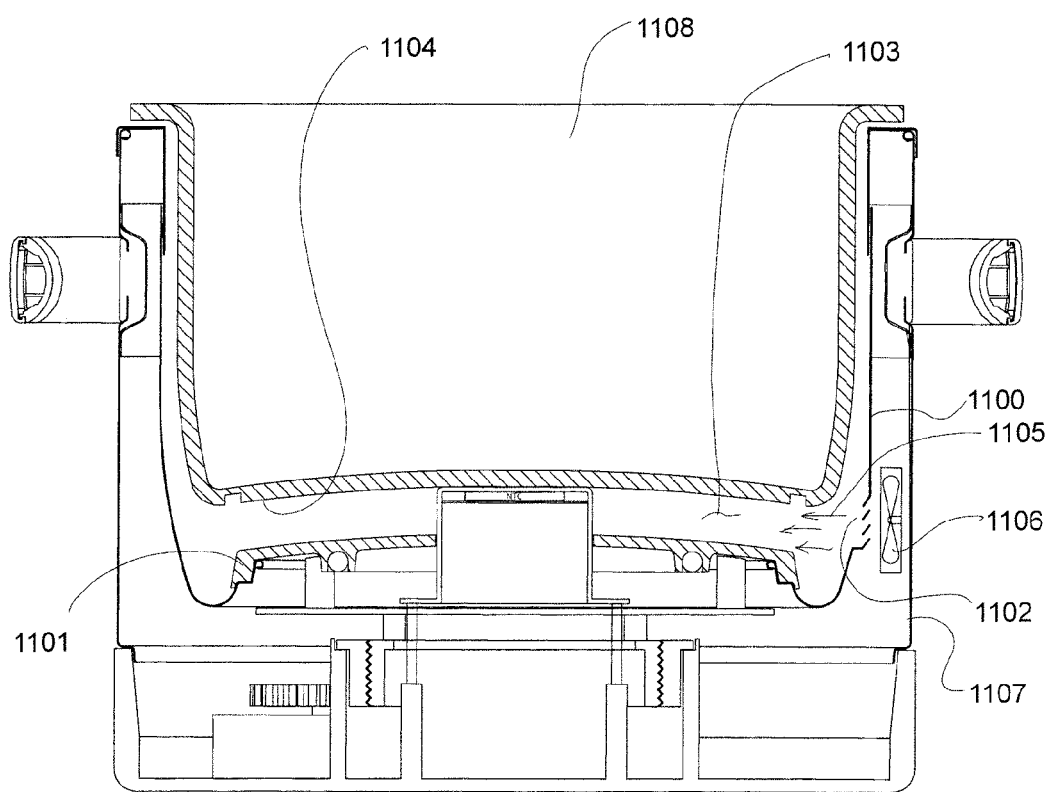
FIG. 11 is a cross-sectional view of an embodiment having vents in the liner and a fan that blows air through the vents.

In another embodiment, and as shown in FIG. 11, the moveable liner 1100 that is attached to the moveable heating plate 1101 as previously described is provided with vents 1102. The vents perforate the liner 1100, preferably in the area close to the gap 1103 formed between the heating plate 1101 and the underside of the cooking vessel 1104. Air is blown into the gap and chamber area 1105 by an electric fan 1106. In this example, the electric fan is located in the space between the liner 1100 and the outside wall 1107 of the base. The air 1105 propelled by the fan turbulates the air in the gap and chamber, distributing the hot air evenly around the cooking vessel 1108.

Figure 12:
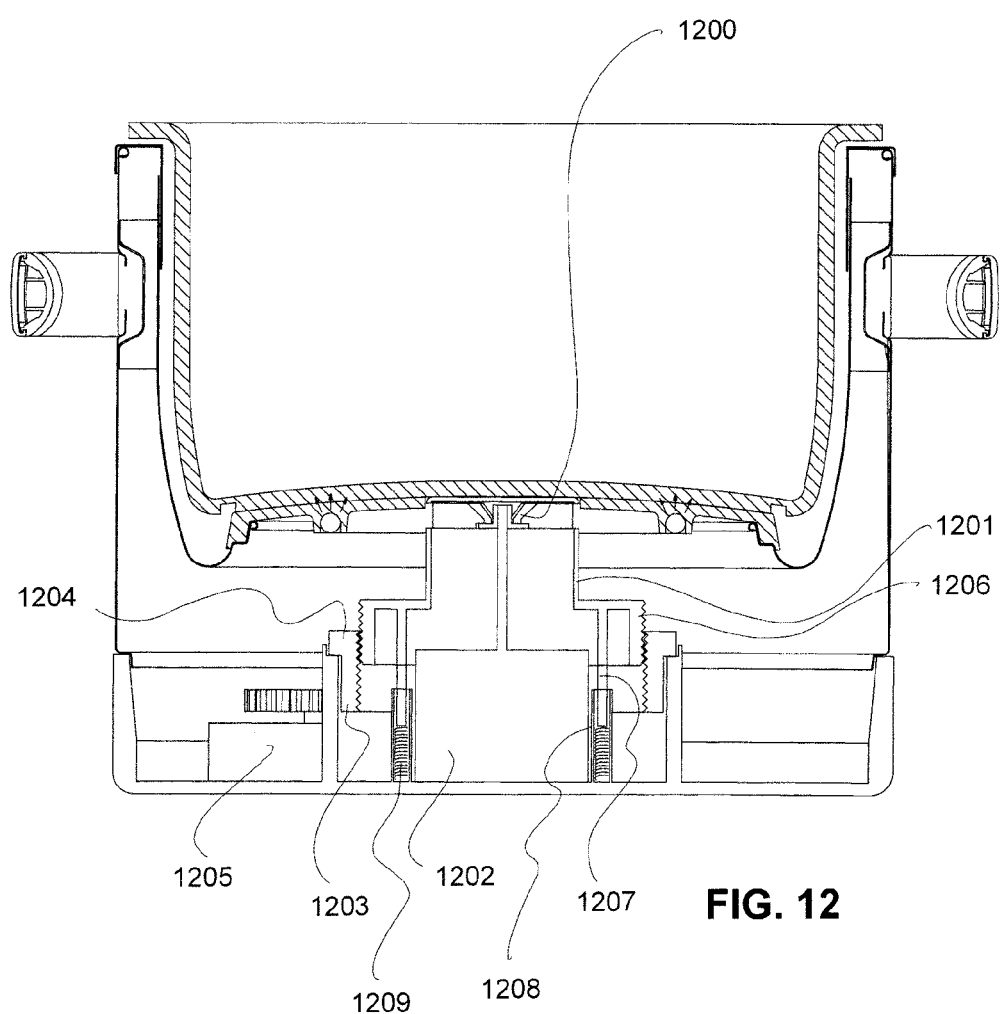
FIG. 12 is a cross-sectional view of an embodiment where the cooking vessel rather than the heating plate can move vertically up and down.
Figure 13:
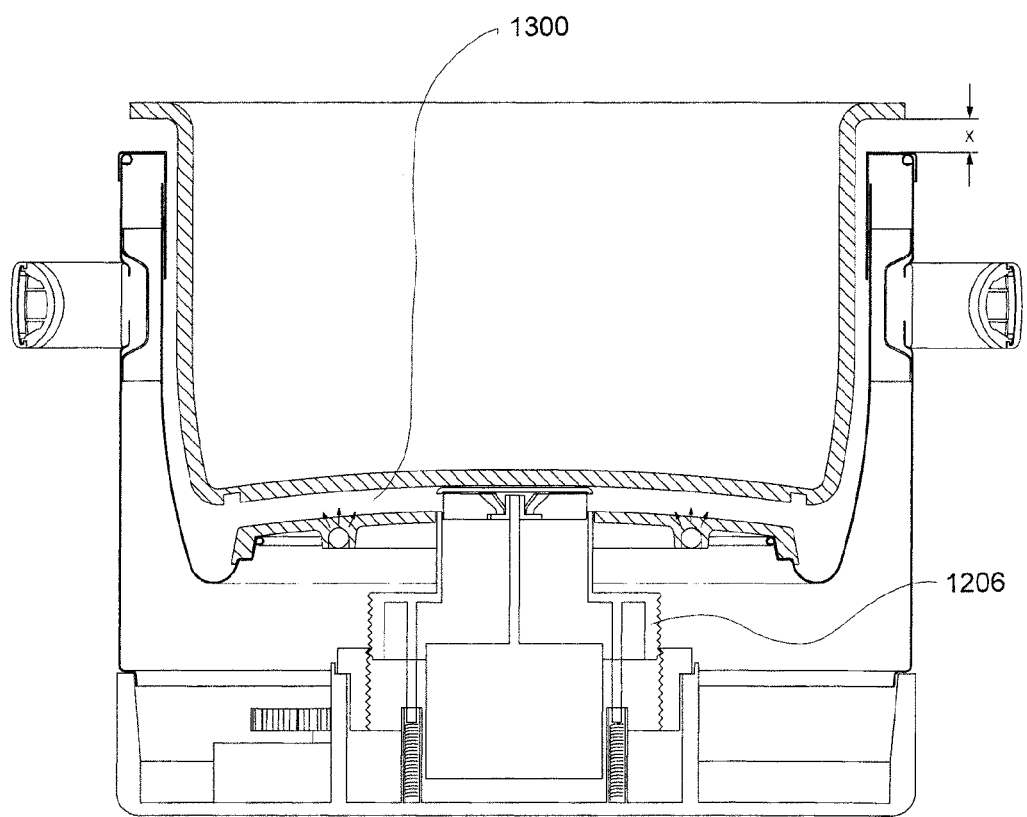
FIG. 13 is a cross-sectional view of an embodiment where the cooking vessel rather than the heating plate can move vertically up and down.

An alternative embodiment is disclosed with reference to FIG. 12 and FIG. 13. In this embodiment, rather than moving the heating plate and its heating elements, the cooking vessel is reciprocated relative to the heating plate by the housing that also contains the fan and the temperature sensor. Thus, as illustrated in FIG. 12, the fan 1200 and its housing 1201 and the fan's motor 1202 move together, in unison, under the influence of the actuator 1203. In this example, the actuator is essentially the same as the one depicted in (for example) FIG. 1 through FIG. 4. That is, an outer threaded ring 1204 is rotated by a motor and pinion gear 1205 relative to a non-rotating inner ring having exterior threads 1206. To stabilise it, the inner ring may be provided with any number of vertical stabilising rods 1207 that are received within co-operating cylinders 1208. A compression spring 1209 within the cylinder and below the rod counteracts the weight carried by the fan housing 1201 owing to the cooking vessel and its contents. In FIG. 12, the fan housing and temperature sensor are shown in a lower most or searing orientation. In FIG. 13, the inner ring 1206 has been elevated. This causes the cooking vessel to rise vertically so as to create a gap 1300 between the underside of the cooking vessel and the top of the heating plate. Note that whether it is the heating plate or the cooking vessel that moves vertically up and down, the temperature sensor remains essentially in contact with the underside of the vessel at all times and during all cooking operations. The springs also help prevent the rods from jamming inside the cylinders.

Figure 14:
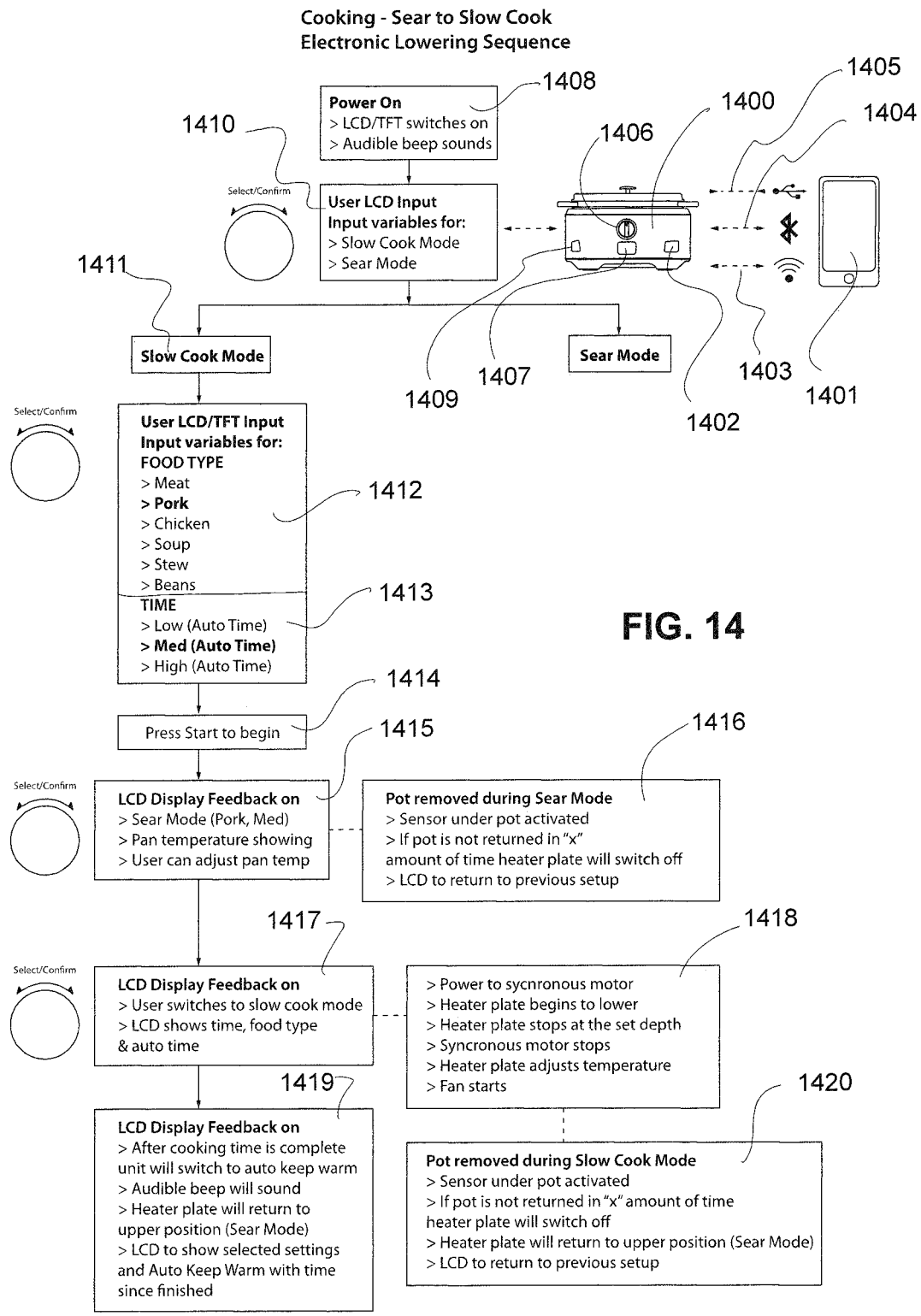
FIG. 14 is a flow chart suggesting modes of operation for the devices disclosed in the specification.

As shown in FIG. 14, a slow cooker with searing functionality as described in the preceding drawing figures and text may communicate with, provide notifications to or be controlled by a remote device such as a computer, remote controller or mobile telephone 1401. The cooker 1400 may be provided with electronic circuitry 1402 required to perform the aforesaid functions over a wireless or WIFI network 1403, a Bluetooth wireless connection 1404 or utilising a hard wired connection such as a USB or other network cable 1405. In preferred embodiments, the device 1400 has a single user control comprising a rotating dial with a push button switching functionality 1406. A display screen such as an LCD or TFT display 1407 is also provided. When power to the device 1400 is first supplied, 1408 the display 1407 switches on and an audible beep is provided by a sound emitting device 1409 located in the base of the cooker. Initially, the display 1407 provides graphic or textual choices to the user so that the user may use the select/confirm knob 1406 to select between a slow cook mode and a sear mode 1410. Selection by rotation of the knob and subsequent confirmation (by pressing the knob or other predefined user input) of the slow cook mode 1411 results in the graphic display 1407 providing, for example, a list or scrollable list of food types 1412. In this example, the selectable food types are meat, pork, chicken, soup, stew and beans. The selection of the food type relates to the cooking temperature or cooking time or both of these. In addition or subsequently, the display can also provide the user with a means of selecting either an exact time or time ranges such as low, medium and high cooking times defined as the time between when the cooking cycle is initiated and when the cooking process ends 1413. Once the food type and time have been input using the select/confirm user input 1406 the cooking process is initiated by pressing the select/confirm controller 1406 or a separate "start" button 1414.

After the start or confirm button has been activated by the user, the display 1407 provides a graphic or textual display 1415 that includes the mode (slow cook or sear), the selected food type 1412 and the temperature of the food cooking as measured by the temperature sensor and interpreted by the device's processor. If the cooking vessel is removed during a searing operation, the absence of the vessel is sensed by a switch or sensor located under the vessel, for example the temperature sensor woo or switch 1451. If the vessel is not returned to its proper location relative to the vessel presence sensor within a pre-set interval of, for example, 3-10 seconds, the controller will cause the heating elements to switch off and the display to return to the previous display settings 1412, 1413. After a searing operation has commenced 1415, the user may, in accordance with display information 1407, switch to the slow cook mode. Thereafter, the display will indicate that the slow cook mode is in effect and will also show the food type and time information such as elapsed cooking time or time remaining or that time is being automatically controlled 1417. If the device is in a searing mode and the user switches the device to a slow cooking mode a series of events 1418 are initiated by the controller. Power is supplied to the synchronous motor 204 that drives the pinion gear 203. The heating plate begins to lower, for example from the position shown in FIG. 1 to the position shown in FIG. 2. The heating plate will stop either automatically or at a user selected depth at which point the synchronous motor stops. The controller then regulates the heating elements to achieve the correct slow cooking temperature and at that time the air circulation fan e.g. 108 is initiated.

After the cooking process is completed, the controller, in conjunction with signals from the temperature sensor maintain the vessel and its contents at a constant and warm temperature 1419. An audible beep and visual information may be provided to alert the user that the cooking process has stopped. Preferably, the heating plate will (without user intervention) return to its upper most position (the sear mode). The display will provide information relating to selected settings, also providing a graphic indication that the "keep warm" mode is still active and also optionally providing an indication of the time elapsed since the end of the cooking process.

If the cooking vessel is removed from the base during a slow cook mode 1420 the vessel presence sensor located beneath the vessel is activated. The controller responds by switching off the heating elements if the vessel is not returned to its position within a pre-determined time, say 3-10 seconds. After this time, the heating plate will be returned to its upper most position (sear mode) and the display will revert to its previous display of information 1412, 1413.

Figure 14A:
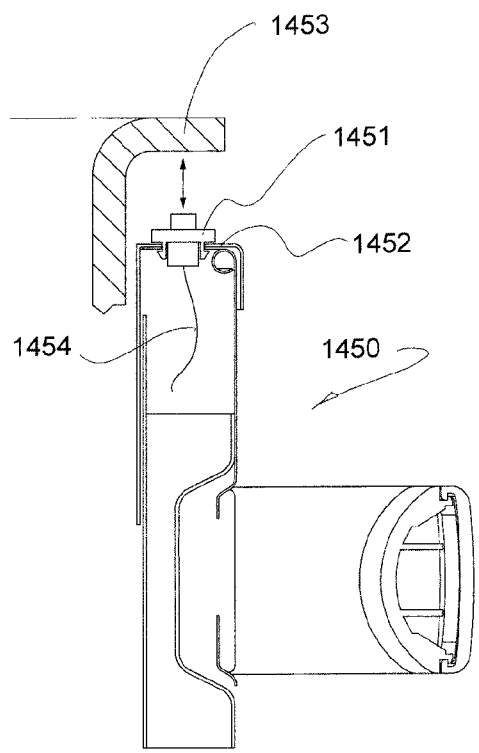
FIG. 14a is a cross sectional view illustrating a presence switch for detecting a cooking vessel.

As shown in FIG. 14a, a slow cooker with searing functionality 1450 may incorporate a switch or sensor 1451 that communicates with the device's processor 107a. In this example, an electrical switch 1451 is mounted in a through opening on an upper rim 1452 in a location below the rim of a cooking vessel 1453 when that vessel is fully installed within the cooker. In this example, the underside of the rim 1453 contacts the switch 1451 and the switch transmits a signal representative of the vessel's presence, by an electrical lead 1454 to the device's controller or processor 107a.

Figure 15:
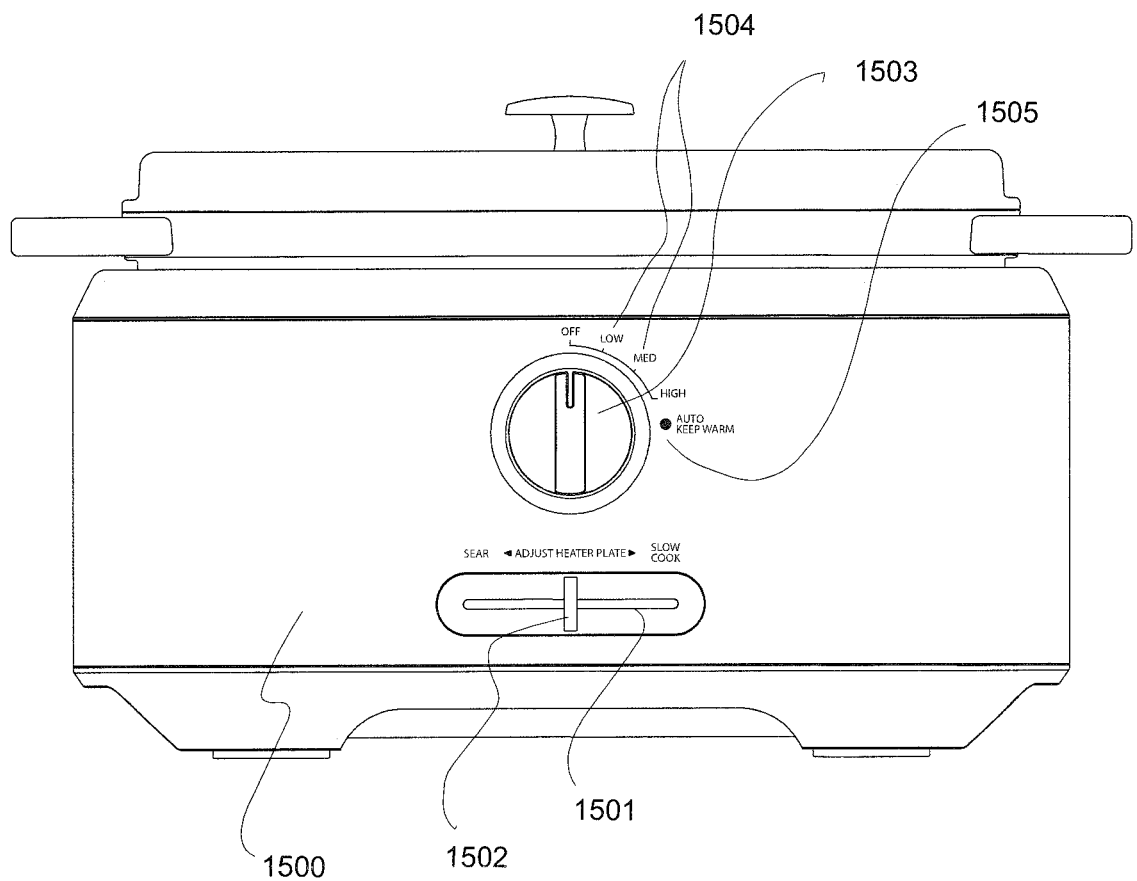
FIG. 15 is a front elevation of a slow cooker with searing functionality having a manual rather than motorised adjustment of the heating plate or vessel.

The searing and slow cooking functionality that has been previously discussed is also achievable in an embodiment where the heating element and its heating plate are adjustable manually rather than electrically. As suggested previously, the same mechanism that can raise and lower the heating plate may be also used to raise and lower a cooking vessel relative to the stationary heating plate. A manually adjustable heating plate and a searing slow cooker is disclosed, by way of example, in FIG. 15 through FIG. 18. In the example of FIG. 15, the outer surface 1500 of the base has a slot such a horizontal slot 1501 through which protrudes a mechanical handle or slider at 1502. FIG. 15 also suggests that the interface can be reduced in complexity with a provision of a selector knob having discreet rotational positions for different regulated cooking temperature such as low, medium and high 1504. In this example an indicator light is provided for indicating when the "keep warm" is enabled 1505. In this example, the slot and slider 1501, 1502 are located symmetrically below the selection knob 1503.

Figure 16:
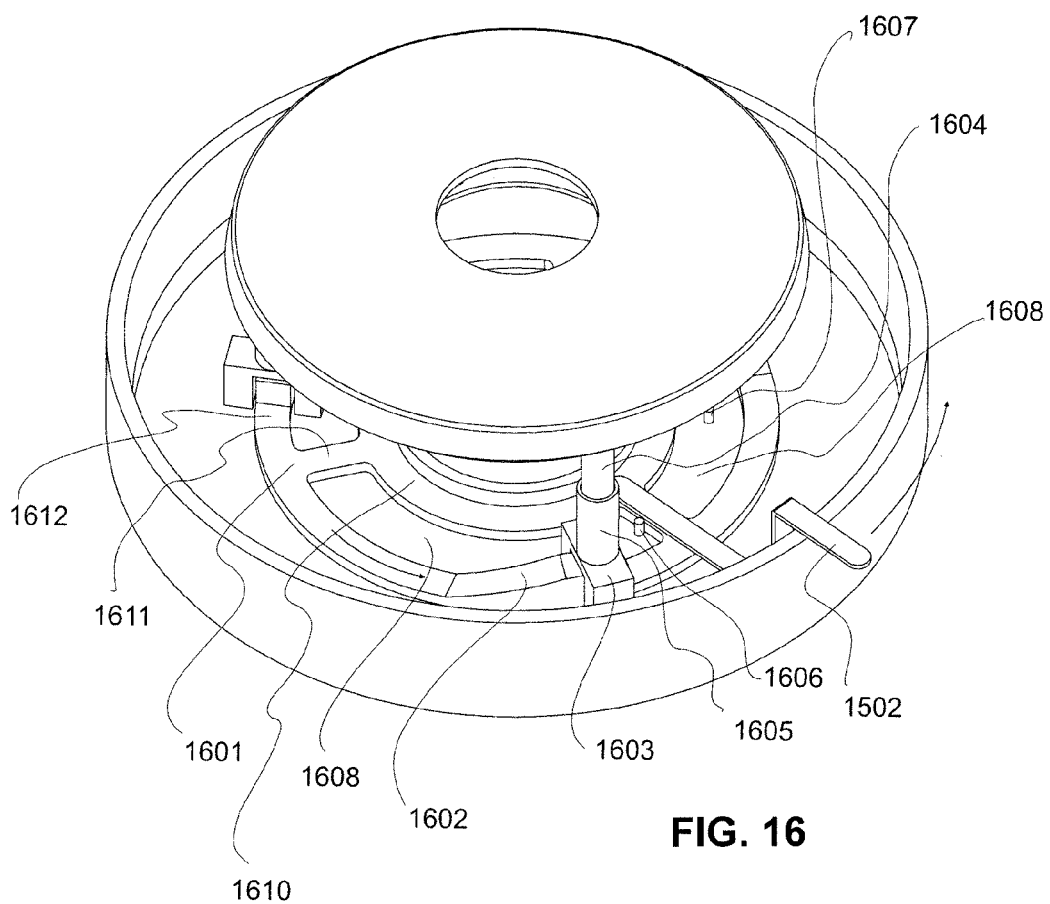
FIG. 16 is a perspective view of the ramp disc and heating plate suggested by FIG. 15.

As shown in FIG. 16, the horizontally reciprocating slider 1502 is attached to a ramp disc 1601. The ramp disc comprises, for example, three spaced apart curved ramps 1602 that rotate about the device's vertical centre line in unison with the movement of the slider 1502. Each ramp is associated with a stationary saddle 1603 having an opening through which extends a lifting rod 1604. The lifting rod 1604 is stabilised and positioned by a cylindrical collar 1605 that is attached to or supported by the saddle 1603.

The horizontal sliding movement of the heating plate vertical position adjustment slider 1502 is limited by a pair of vertical posts or obstructions 1606, 1607. The position limits 1606, 1607 extend through openings 1608 in the ramp disc 1601 and establish the mechanical limits of the range of motion of the slider 1502.

It can be seen at FIG. 16 that the ramp 1601 may have an inner ring 1610 connected by radial spokes 1611 to an outer ring 1612 that carries the ramps 1602. Openings 1608 between the inner and outer rings 1610, 1612 accommodate the passage of the mechanical limits 1606, 1607.

Figure 18:
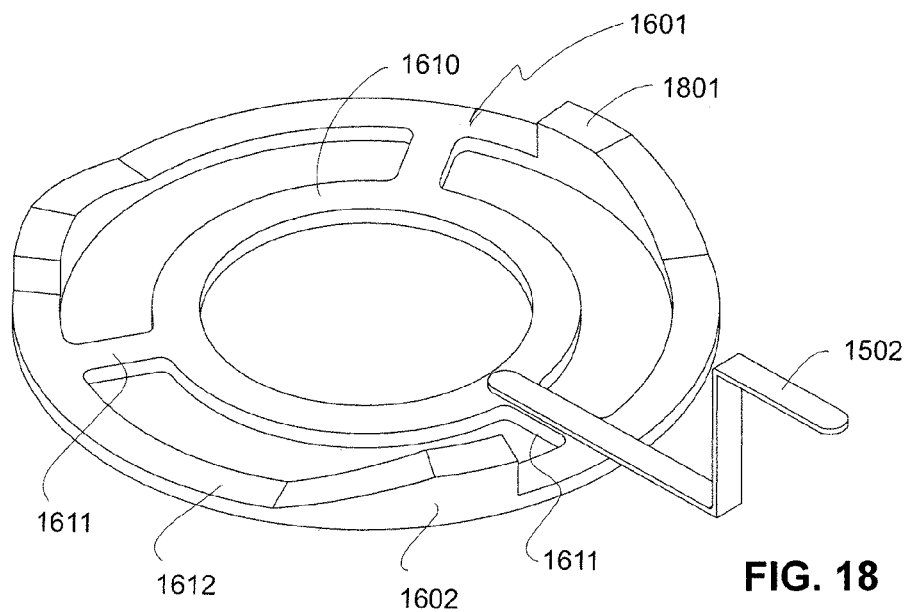
FIG. 18 is a perspective view of a ramp ring and manual slider.

As shown in FIG. 18, the slider or slider handle 1502 may be formed separately and attached to the ramp disc 1601. In the embodiment of FIG. 18 it is attached to one of the spokes 1611 that interconnect the inner ring 1610 with the outer ring 1612. In this example, there are three ramps 1602, each having a horizontal or flat spot 1801 corresponding to the highest point of travel.

Figure 19:
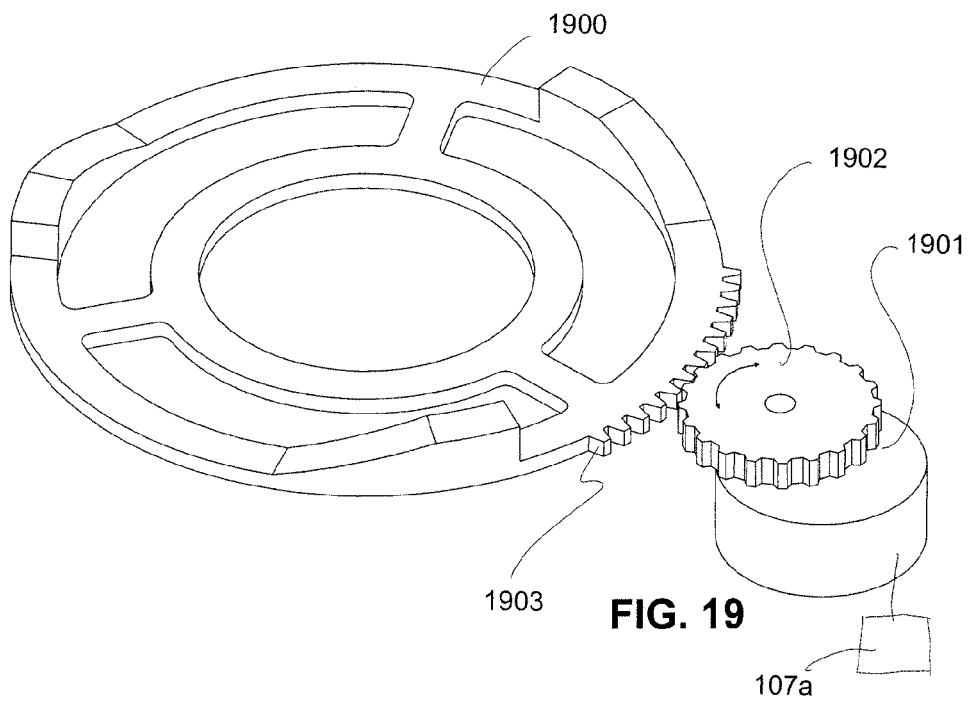
FIG. 19 is a perspective view of a ramp ring and motorised adjustment mechanism.

As suggested by FIG. 19 a ramp ring 1900 of the type generally disclosed above may be rotated with, for example, a synchronous motor 1901 that drives a pinion gear 1902 that engages an arc shaped array of driven teeth 1903. The motor is operated by the device's controller 107a similarly to the synchronous motor 204 disclosed with reference to, for example, FIG. 2.

Figure 17:
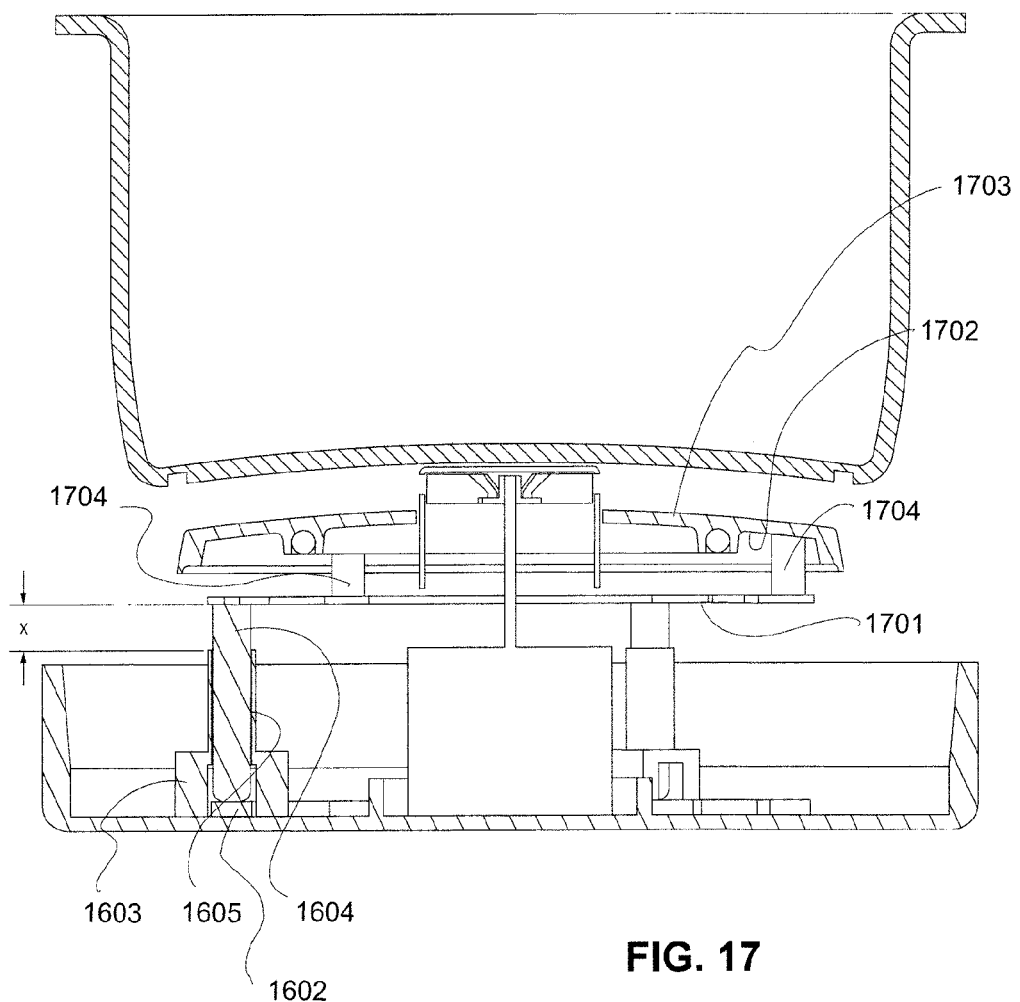
FIG. 17 is a cross-sectional view of a heating plate supported by a ramp mechanism of the kind suggested by FIG. 16.

As shown in FIG. 17, heat flow to the rods or posts 1604 is reduced by attaching them to a metal plate or heat shield 1701. The heat shield 1701 is attached to the underside 1702 of the heating plate 1703 by a plurality of attachment posts 1704. Accordingly, the heating plate shown in FIG. 17 as well as the heating plates of a kind disclosed in FIG. 1 through FIG. 4 can be adjusted vertically using a manual slider and ramp assembly of the kind shown in FIG. 15 through FIG. 17.

Figure 20:
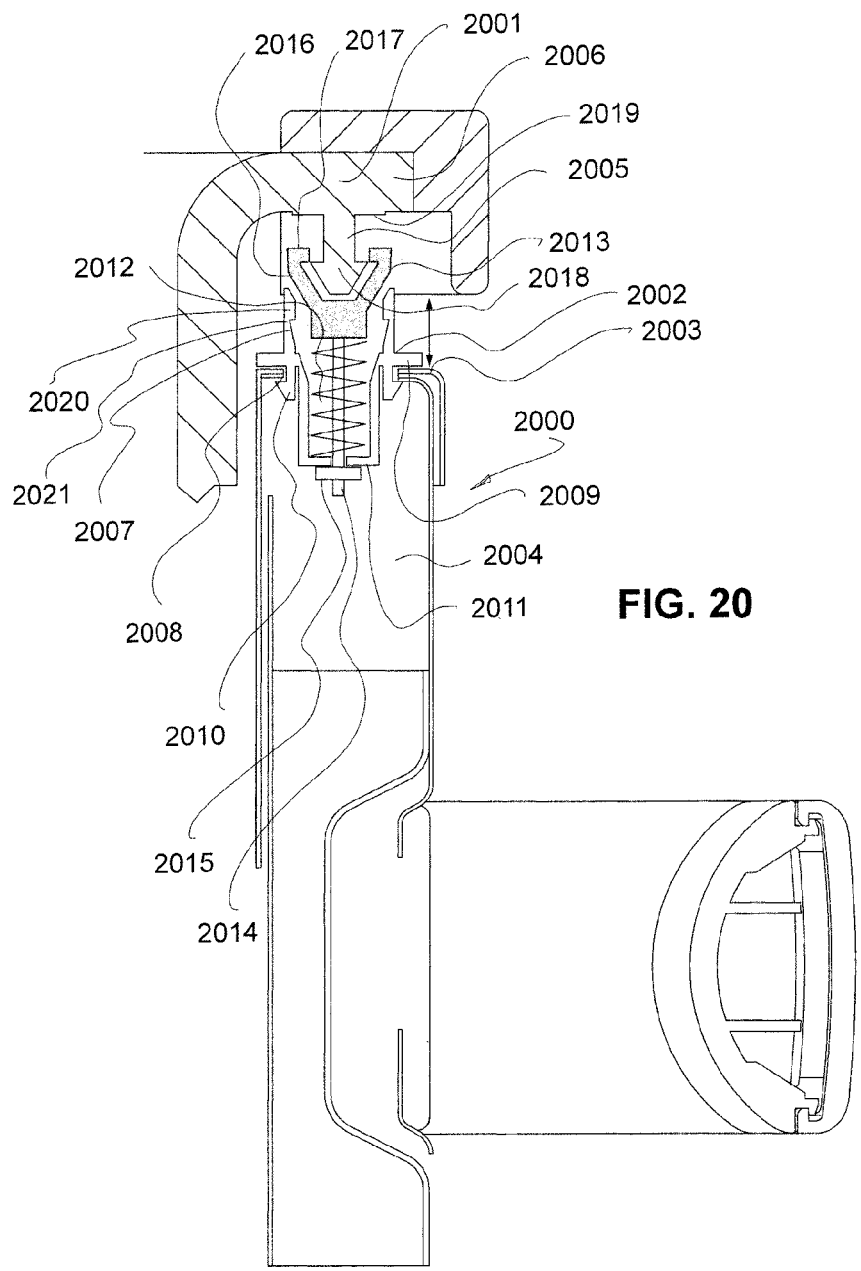
FIG. 20 is a cross-sectional view of a mechanism for raising and lowering a cooking vessel in a searing slow cooker, in a searing orientation.

As shown in FIG. 20, a slow cooker with searing functionality 2000 may incorporate features for manually raising and lowering the cooking vessel 2001. In embodiments such as this, the heating plate is fixed or stationary. In this example, a locking and raising mechanism 2002 is located on an upper rim 2003 of the base 2004. The mechanism 2002 co-operates with a spade or arrow type pin 2005 located on an underside of the outwardly directed rim 2006 of the cooking vessel 2001. In order to keep the cooking vessel level, two, three or more pairs of mechanisms 2002 and co-operating pins 2005 may be provided around the upper rim. In the example of FIG. 20, a polymeric lock body 2007 is partially inserted into an opening 2008 on the upper rim 2003. The body has a peripheral shoulder 2009 that is maintained in position relative to the upper rim by two or more flexible retaining clips 2010 that flex on installation and thereafter engaged the rim of the opening through which the body 2002 is inserted. The lower part of the body comprises a cavity or holder 2011 for a compression spring 2012. The spring exerts an upward force on a flexible retaining head 2013. The retaining head 2013 is attached to a shaft 2014 that captures the spring 2012. The upward limit of travel of the shaft 2014 and head 2013 is limited by a stopper 2015 located on the shaft and external to the chamber 2011. The retaining head 2013 has a central hub that supports, for example, a number of flexible arms 2016. Each arm 2016 terminates in a bead or lip 2017. The innermost tips of each lip 2017 define an opening through which the enlarged head of the pin 2013 may pass when the head is in the uppermost or open position. The uppermost position is depicted in FIG. 20 and represents the position of the cooking vessel during a slow cooking process.

As further shown in FIG. 20, each pin 2005 comprises an enlarged head 2018 that is adapted to be captured by the arms 2016 when the arms are brought together, as will be explained. Also illustrated is a shoulder or release detail 2019 that is adapted to co-operate with the two or more locking arms 2020 that are located above the flange 2009. Each locking arm 2020 has an undercut shoulder 2021 that allows each locking arm to engage and trap the upper rim of the enlarged head 2018. In this orientation, the cooking vessel 2001 is supported by the array of mechanisms 2002 in an orientation where the bottom of the vessel 2001 is spaced above a preferably fixed heating plate, for example, the kind previously discussed.

Figure 21:
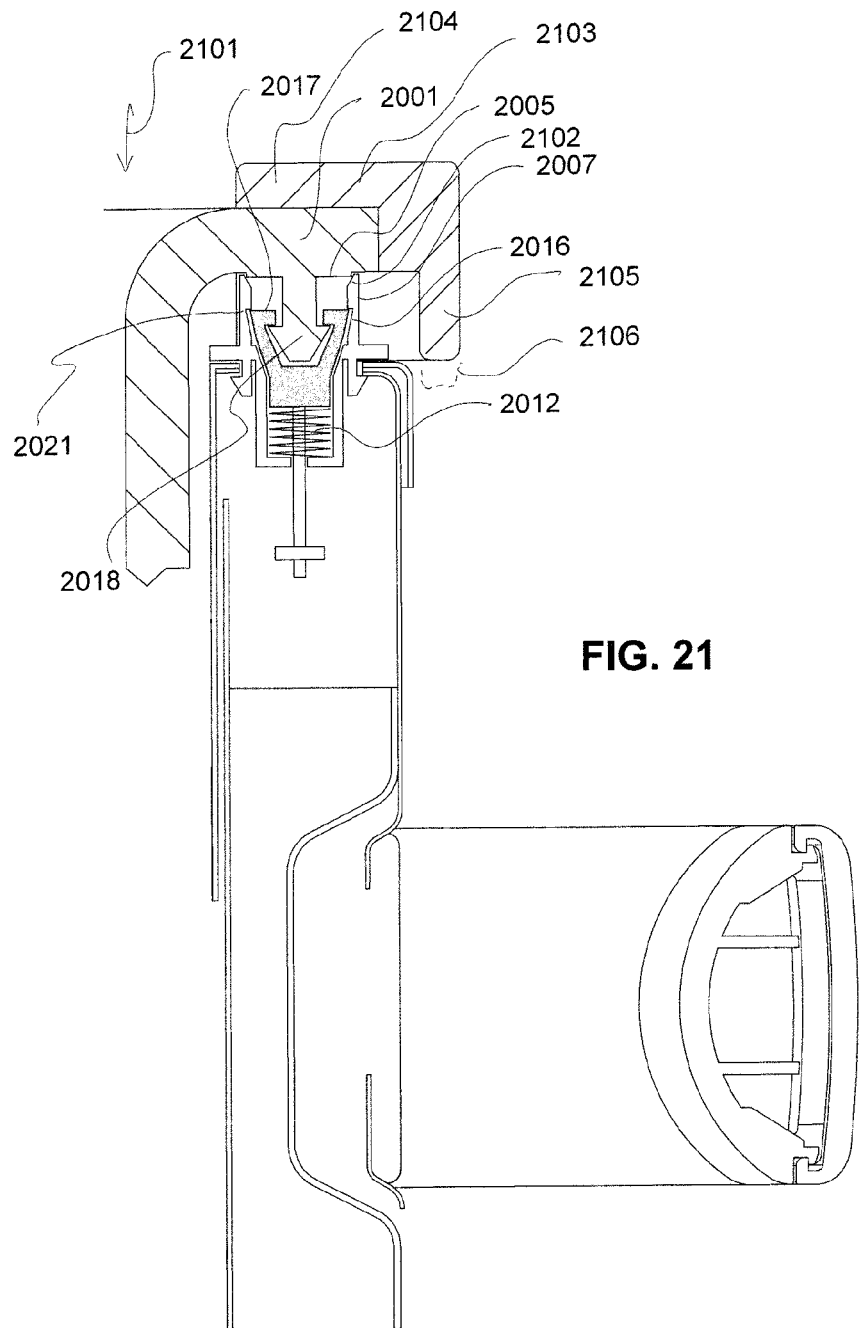
FIG. 21 is a cross-sectional view of a mechanism for raising and lowering a cooking vessel in a searing slow cooker, in a slow cooking orientation.

As shown in FIG. 21, the mechanism depicted in FIG. 20 can have a lower or locked position which is adapted to searing orientations. The vessel 2001 cannot be removed in the lower position. In searing orientations, the bottom of the cooking vessel 2001 is preferably in direct contact with a heating plate. As suggested by FIG. 21, pressing the rim of the vessel towards the base traps the head 2018 of the pin 2013 with the retaining fingers 2016 this is because the flexible retaining fingers 2016 are compressed by the locking fingers into an orientation where the retaining lips or beads 2017 trap the head 2018. The retaining fingers 2016 are unable to open or expand and likewise, cannot move upward or release the pin because of the trapping effect of the undercuts 2021. In this orientation the spring 2012 is compressed. However, urging the upper rim downward or toward the base 2101 causes the shoulders 2005 to bear on and spread apart the chamfered upper portions 2102 of the locking fingers so that the retaining fingers 2016 can be driven upward by the spring 2012 and thus escape thereafter assuming the orientation depicted in FIG. 20.

The upper rim of the cooking vessel may be protected by a peripheral polymeric (e.g. silicone rubber) heat insulating rim 2103. The rim has a horizontal extent forming upper surface 2104 and a peripheral skirt 2105 that preferably extends downwardly to at least partially protect the upper part of the mechanism. In some embodiments the lowest extent of the skirt 2106 extends lower than the upper rim 2003 of the base. It will be appreciated that the mechanism depicted in FIG. 20 and FIG. 21 may be utilised in conjunction with practically any construction of slow cooker or cooking device where it is desirable to provide a cooking vessel 2001 with uniform vertical movement that facilitates upper and lower cooking positions, particularly searing and slow cooking positions.

FIG. 22 through FIG. 26 illustrate embodiments of the technology that utilise a vertically adjustable (or movable) heating element that makes contact with, or creates a gap between, itself and an underside of an adjacent vessel or liner that receives a vessel.

Figure 22:
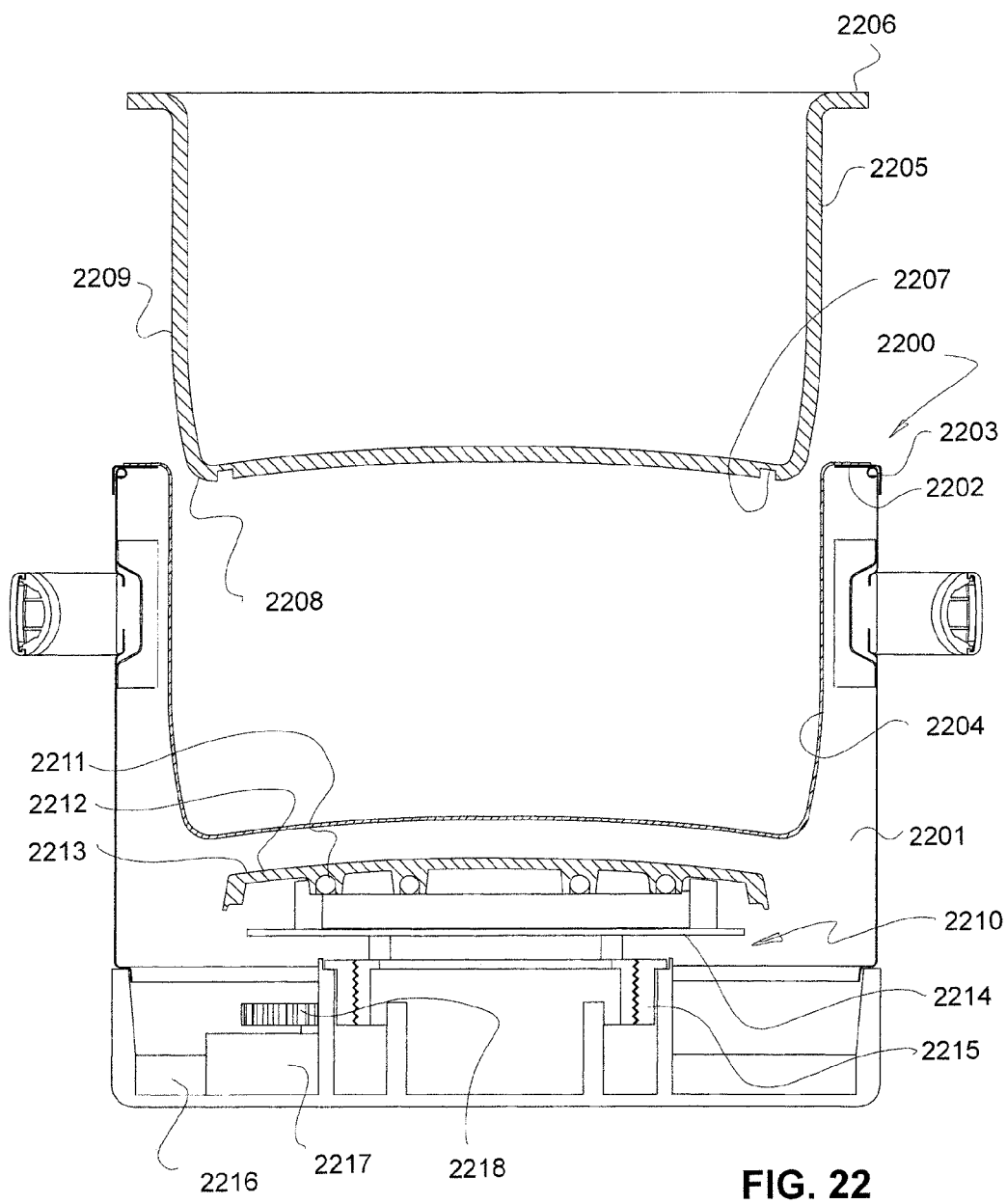
FIG. 22 is a section view of an embodiment slow cooker according to the technology, which utilise a vertically adjustable heating element.

As shown in FIG. 22, an embodiment slow cooker 2200 with searing functionality has a main body portion 2201. The upper end of the main body portion 2201 is terminated by an inwardly directly rim 2202. In this example, the rim 2202 is part of a rim assembly 2203. The rim 2202 supports a fixed or removable liner 2204. The liner conforms to the shape of a cooking vessel 2205. The vessel 2205 has an outwardly directed upper rim 2206. The underside of the vessel may also have a circumferential groove 2207, which is adjacent to its outer edge 2208. The groove limits heating of the vessel's sidewall 2209.

A vertically adjustable heating element 2210 is positioned within the main body and below the liner 2204. In this example, the heating element 2211 is carried by a heat distribution plate 2212 whose upper surface 2213 is shaped to conform to the underside of the vessel 2204. The assembly 2214 that holds the heating element and heat distribution plate is carried by an actuator or jack screw mechanism 2215 that is controlled by the device's processor 2216. The processor transmits power to an electric motor 2217. The motor 2217 drives the jack screw mechanism 2215, preferably through a reduction gear 2218.

With reference to earlier teaching of a mechanical means to reciprocate the heating source, for example as shown in FIG. 15 through 18, while the controller may remember or sense where the heating element is positioned a user may be enabled or required to manually interact with a mechanical actuator.

Figure 23:
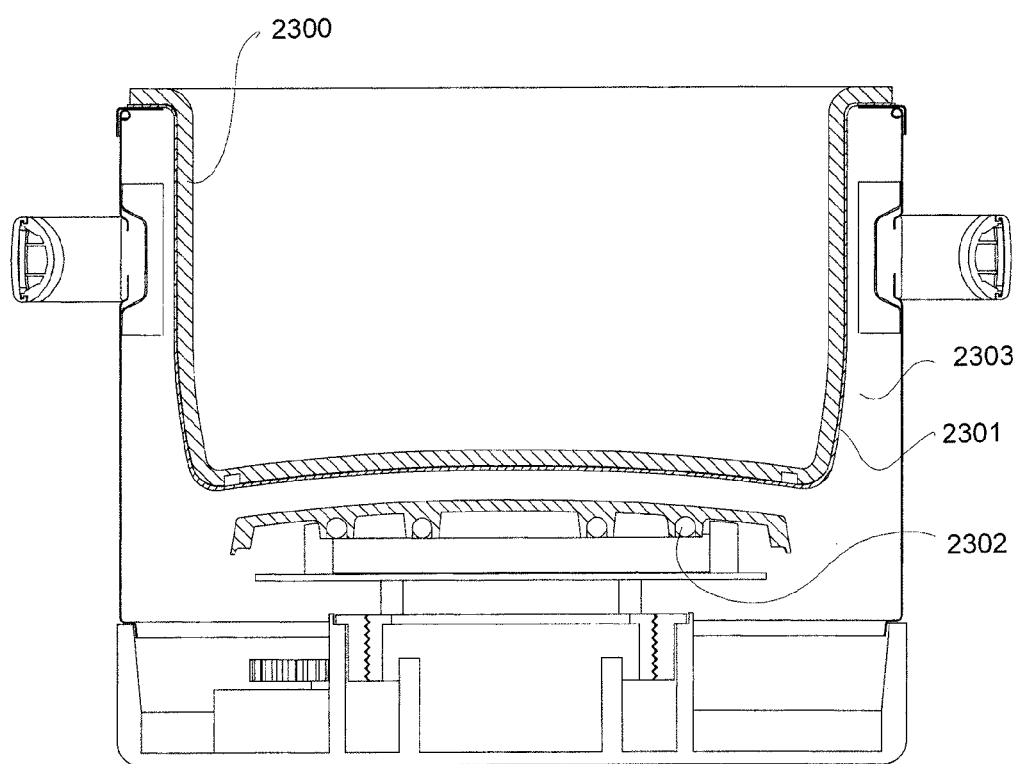
FIG. 23 is a section view of an embodiment slow cooker according to FIG. 22.

As shown in FIG. 23, when inserted, the vessel 2300 fits snugly within the liner 2301. Thus, when the heating element 2302 is activated, hot air circulates within the internal compartment 2303, both under and around the liner 2301.

Figure 24:
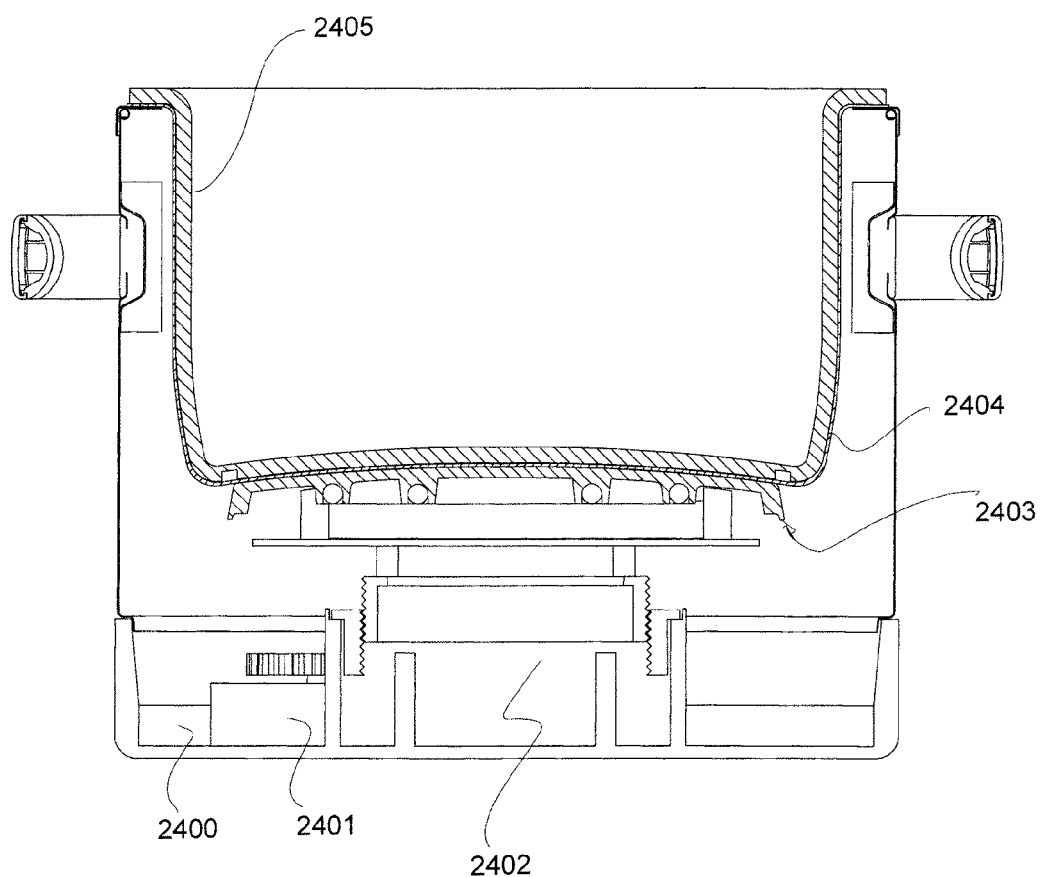
FIG. 24 is a section view of an embodiment slow cooker according to FIG. 22.

As illustrated in FIG. 24, instructions from the processor 2400 may be transmitted to the motor 2401 in response to a stored cooking program or a command input from a user. The motor and reduction gear cause the jack screw 2402 to elevate the heating element and heat distribution plate 2403 into surface contact with the underside of the liner 2404. In this orientation, both the vessel 2405 and liner 2404 are heated by conduction rather than convection. This is the preferred orientation for searing within the vessel 2405.

Figure 25:
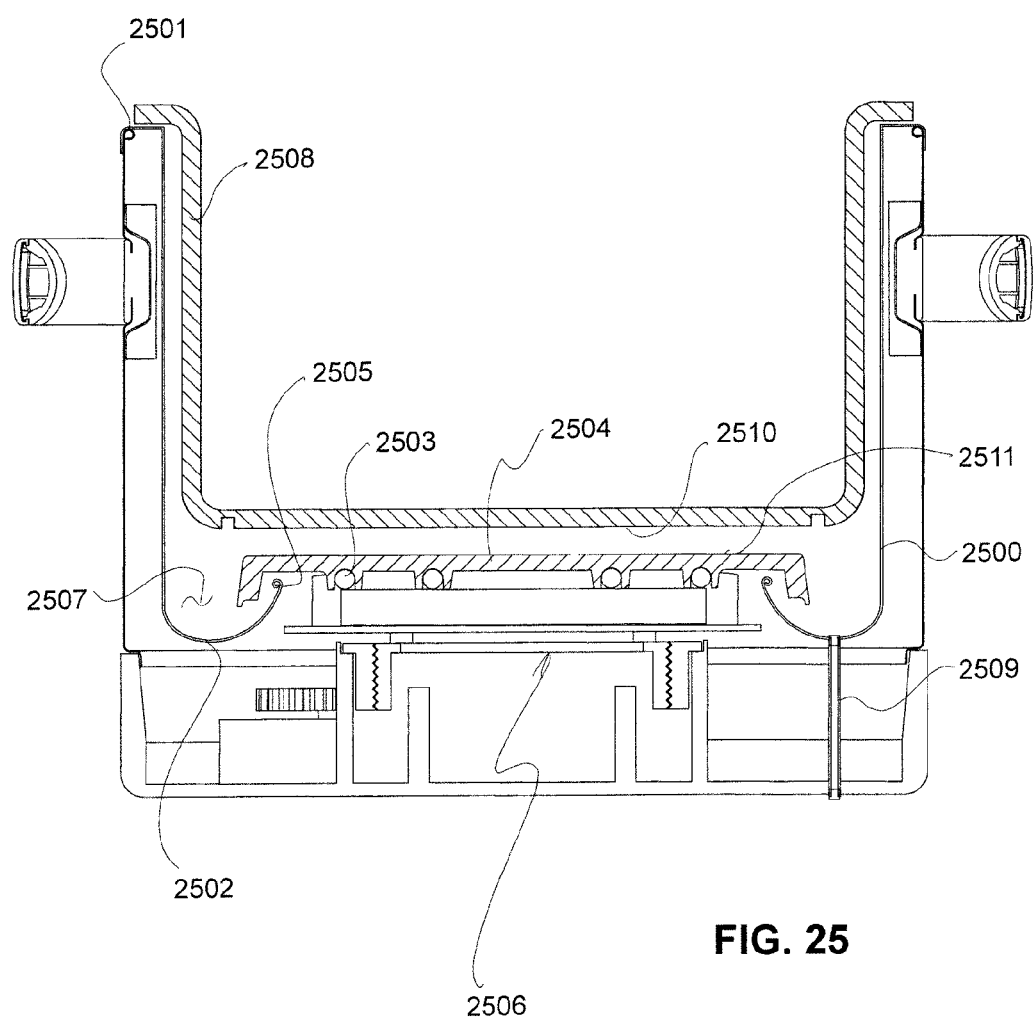
FIG. 25 is a section view of an embodiment slow cooker according to the technology, which utilise a vertically adjustable heating element.

In the example of the FIG. 25, the applicant has an internal liner 2500 that extends from approximately the upper rim 2501 to a location 2502 that is below the vertically adjustable heating element 2503 and heat distribution plate 2504. The liner 2502 has an internal rim 2505 that defines a central opening through which extends the lifting mechanism or jack screw 2506. Because the rim 2505 is higher than the lowest point of the liner 2502, the lower part of the liner forms a circumferential trough 2507 that is able to capture debris that falls between the vessel 2508 and the liner 2500.

In preferred embodiments, a low point of the trough 2507 carries a drain tube 2509 that carries fluids away from the trough 2507. In this example, the vessel 2508 has a flat bottom 2510 and accordingly, the upper surface of the heat distribution plate 2611 is also flat. The jack screw 2506 is able to raise and lower the heating element and heat distribution plate without interfering with the liner 2500.

Figure 26:
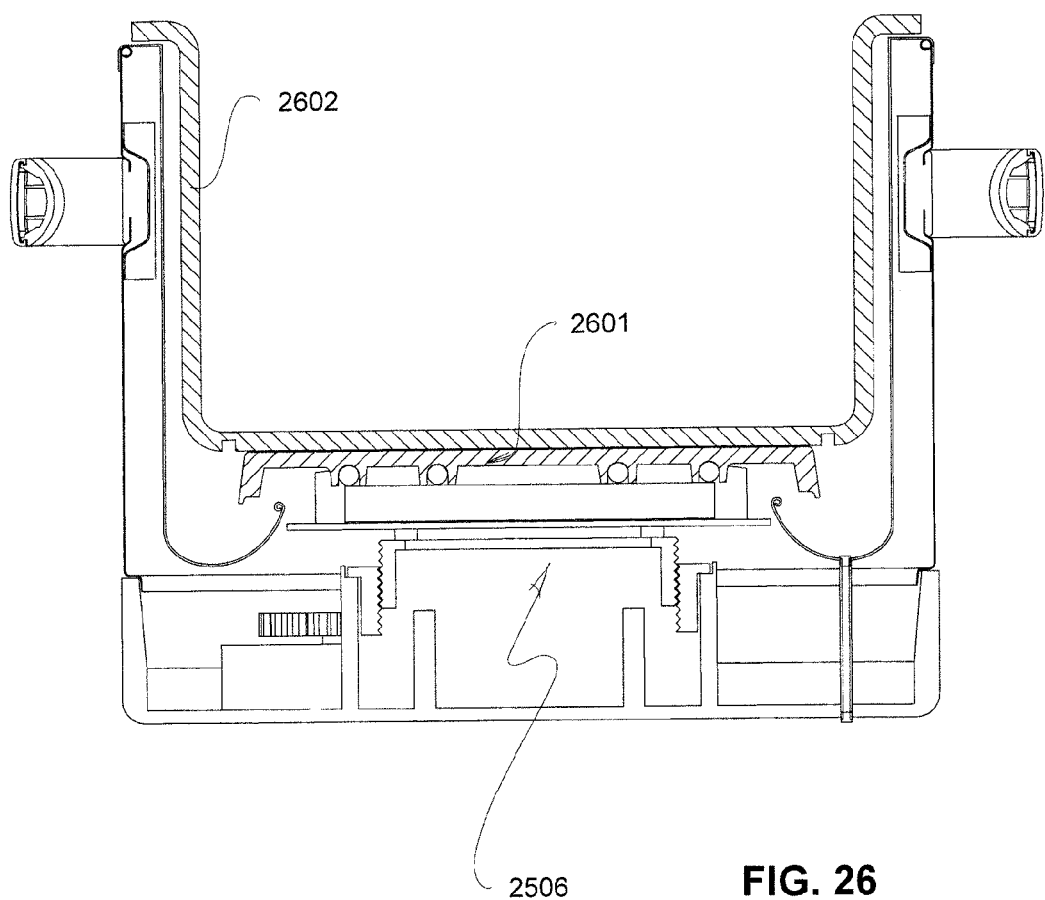
FIG. 26 is a section view of an embodiment slow cooker according to FIG. 25.

As shown in FIG. 26, the jack screw or lifting mechanism 2506 has elevated the heating element and heat distribution plate 2601 into surface contact with the underside of the cooking vessel 2602.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating, "regulating" "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

What is claimed is:

1. A slow cooking appliance device, the device including:
   a body having a base, the body receives within it a removable cooking vessel;
   a movable heating element supported by the base; and
   a lift mechanism within the base for raising and lowering the movable heating element, such that the heating element is movable between an upper position and a lowered position,
   wherein the cooking vessel has a substantially flat floor and a side wall, and further wherein an underside of the floor includes a single heat-inhibiting circumferential groove that inhibits flow of heat to the side wall, the heat-inhibiting circumferential groove located radiantly outward of an outer edge of the heating element, and
   wherein the heat-inhibiting circumferential groove is a circumferential indentation, a depth of the indentation extending inwardly into the underside of the floor of the cooking vessel such that a floor of the indentation forms an area of reduced thickness relative to a substantially uniform thickness of the floor of the cooking vessel.

2. The device according to claim 1, wherein, when the movable heating element is in the upper position, the movable heating element is substantially conductively thermally coupled to the removable cooking vessel.

3. The device according to claim 1, wherein, when the movable heating element is in the lowered position, the movable heating element defines a gap such that the removable cooking vessel is substantially heated by the movable heating element through a process of convection heating.

4. The device according to claim 1, wherein the lift mechanism uses a jack screw assembly to raise and lower the movable heating element.

5. The device according to claim 1, wherein the lift mechanism is operated by a motor that is controlled by a processor for raising and lowering the movable heating element.

6. The device according to claim 5, wherein the lift mechanism is manually operated by a movable lever that acts to raise and lower the movable heating element.

7. The device according to claim 1, wherein an upper surface of the movable heating element substantially conforms to an underside of the vessel for enabling conductive heating there between.

8. The device according to claim 1, the device further including a temperature sensor that is in thermal communication with the vessel.

9. The device according to claim 8, the device further including a sensor plate that carries the temperature sensor, sensor plate is adapted to make thermal contact with the lower surface of the vessel floor.

10. The device according to claim 8, wherein the temperature sensor transmits a temperature signal to a processor for regulating a cooking processes.

11. The device according to claim 8, wherein the temperature sensor is located above an electric fan.

12. The device according to claim 1, the device further including an electric fan that assists convection heat transfer from the heating element.

13. The device according to claim 1, wherein the lift mechanism further comprises:
   a first thread carried on an inner surface of an outer ring engaged with the base, and a second thread formed on an outside surface of an inner ring, the inner ring carrying the heating element; and
   wherein the first thread and the second thread cooperate to move the heating element between the upper position and the lowered position.

14. The device according to claim 1, wherein the heat-inhibiting circumferential groove is spaced radically outwardly of the heating element.

* * * * *